US009562190B2

(12) United States Patent
Saito et al.

(10) Patent No.: US 9,562,190 B2
(45) Date of Patent: Feb. 7, 2017

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/811,856

(22) Filed: Jul. 29, 2015

(65) Prior Publication Data

US 2016/0053177 A1 Feb. 25, 2016

(30) Foreign Application Priority Data

Aug. 25, 2014 (JP) ................................ 2014-170262
Jan. 21, 2015 (JP) ................................ 2015-009404

(51) Int. Cl.

*G02F 1/1333* (2006.01)
*C09K 19/34* (2006.01)
*C09K 19/32* (2006.01)
*C09K 19/30* (2006.01)
*C09K 19/54* (2006.01)
*C09K 19/04* (2006.01)

(52) U.S. Cl.

CPC ....... *C09K 19/3402* (2013.01); *C09K 19/3098* (2013.01); *C09K 19/32* (2013.01); *C09K 2019/0448* (2013.01); *C09K 2019/3422* (2013.01); *C09K 2019/3425* (2013.01); *C09K 2019/548* (2013.01)

(58) Field of Classification Search

CPC ... G02F 1/1333; C09K 19/3402; C09K 19/32; C09K 19/3098; C09K 2019/0448; C09K 2019/548; C09K 2019/3422; C09K 2019/3425
USPC ..... 252/299.01, 299.6, 299.62; 349/182, 183
See application file for complete search history.

(56) References Cited

U.S. PATENT DOCUMENTS

| | | | | |
|---|---|---|---|---|
| 7,087,272 B2 * | 8/2006 | Bremer | .................. | C07C 22/08 252/299.01 |
| 7,297,379 B2 * | 11/2007 | Schmidt | .................. | C07C 25/22 252/299.62 |
| 2005/0255258 A1 | 11/2005 | Schmidt et al. | | |

FOREIGN PATENT DOCUMENTS

| | | | | |
|---|---|---|---|---|
| EP | 1223210 | | 7/2002 | |
| JP | 10-236992 | * | 9/1998 | ............ C07C 25/22 |
| JP | 2005-350455 | | 12/2005 | |
| JP | 2009-249355 | | 10/2009 | |

* cited by examiner

*Primary Examiner* — Geraldina Visconti
(74) *Attorney, Agent, or Firm* — Jianq Chyun IP Office

(57) ABSTRACT

A liquid crystal composition and an AM LCD device including the same are described. The liquid crystal composition has a negative dielectric anisotropy, contains a specific compound having a large negative dielectric anisotropy as a first component, and may further contain a specific compound having high a maximum temperature or a small viscosity as a second component, a specific compound having a negative dielectric anisotropy as a third component, and/or a specific compound having a polymerizable group as an additive component.

17 Claims, No Drawings

LIQUID CRYSTAL COMPOSITION AND LIQUID CRYSTAL DISPLAY DEVICE

CROSS-REFERENCE TO RELATED APPLICATION

This application claims the priority benefits of Japan Patent Application no. 2014-170262, filed on Aug. 25, 2014, and Japan Patent Application no. 2015-009404, filed on Jan. 21, 2015. The entirety of each of the above-mentioned patent applications is hereby incorporated by reference herein and made a part of this specification.

TECHNICAL FIELD

The invention relates to a liquid crystal composition, a liquid crystal display (LCD) device including the composition and so forth. In particular, the invention relates to a liquid crystal composition having a negative dielectric anisotropy, and an LCD device that includes the composition and has a mode such as an IPS, VA, FFS or FPA mode. The invention also relates to an LCD device having a polymer sustained alignment (PSA) mode.

BACKGROUND ART

For LCD devices, a classification based on the operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, and a field-induced photo-reactive alignment (FPA) mode. A classification based on the driving mode of the device includes passive matrix (PM) and active matrix (AM) types. The PM type is classified into static type, multiplex type and so forth, and the AM type is classified into thin film transistor (TFT) type, metal insulator metal (MIM) type and so forth. The TFT type is further classified into amorphous silicon type and polysilicon type. The latter is classified into a high temperature type and a low temperature type according to the production process. A classification based on the light source includes a reflective type utilizing natural light, a transmissive type utilizing a backlight and a transflective type utilizing both natural light and a backlight.

An LCD device includes a liquid crystal composition having a nematic phase. The composition has suitable characteristics. An AM device having good characteristics can be obtained by improving the characteristics of the composition. Table 1 below summarizes the relationship between the characteristics of two aspects. The characteristics of the composition will be further described based on a commercially available AM device. The temperature range of the nematic phase relates to the temperature range in which the device can be used. A preferred maximum temperature of the nematic phase is about 70° C. or higher and a preferred minimum temperature of the nematic phase is about −10° C. or lower. The viscosity of the composition relates to the response time of the device. A short response time is preferred for displaying moving images on the device. A shorter response time even by one millisecond is desirable. Accordingly, a small viscosity in the composition is preferred. A small viscosity at a low temperature is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption<br>Large contrast ratio |
| 5 | Large specific resistance | Large voltage holding ratio and large contrast ratio |
| 6 | High stability to UV light and heat | Long service life |

The optical anisotropy of the composition relates to the contrast ratio of the device. According to the mode of the device, a suitable optical anisotropy such as a large optical anisotropy or small optical anisotropy is required. The product ($\Delta n \times d$) of the optical anisotropy ($\Delta n$) of the composition and the cell gap (d) in the device is designed so as to maximize the contrast ratio. A suitable value of the product depends on a type of the operating mode. In a device having the VA mode, the suitable value is in the range of about 0.30 μm to about 0.40 μm, and in a device having the IPS mode or the FFS mode, the suitable value is in the range of about 0.20 μm to about 0.30 μm. In the above cases, a composition having a large optical anisotropy is preferred for a device having a small cell gap. A large value of dielectric anisotropy in the composition contributes to a low threshold voltage, a small electric power consumption and a large contrast ratio in the device. Accordingly, the large value of dielectric anisotropy is preferred. A large specific resistance in the composition contributes to a large voltage holding ratio and a large contrast ratio of the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. The stability of the composition to UV light and heat relates to the service life of the device. In a case where the stability is high, the device has a long service life. Such characteristics are preferred for an AM device for use in a liquid crystal projector, a liquid crystal television and so forth.

A liquid crystal composition containing a polymer is used for an LCD device having a PSA mode. First, a composition to which a small amount of polymerizable compound is added is injected into the device. Next, the composition is irradiated with UV light, while a voltage is applied between substrates of the device, to polymerize the polymerizable compound to forma network structure of the polymer in the composition. In the composition, alignment of liquid crystal molecules can be controlled by the polymer, and therefore the response time of the device is shortened and image persistence is reduced. Such an effect of the polymer can be expected for a device having a mode such as the TN, ECB, OCB, IPS, VA, FFS or FPA mode.

A composition having a positive dielectric anisotropy ($\Delta\epsilon$) is used for an AM device having the TN mode. A composition having a negative $\Delta\epsilon$ is used for an AM device having the VA mode. A composition having a positive or negative Δ∈ is used for an AM device having the IPS or FFS mode. A composition having a positive or negative Δ∈ is used for an AM device having the PSA mode. Examples of the liquid crystal composition having the negative Δ∈ are disclosed in Patent literature Nos. 1 to 3 described below.

CITATION LIST

Patent Literature

Patent literature No. 1: EP 1223210 A.
Patent literature No. 2: JP 2005-350455 A.
Patent literature No. 3: JP 2009-249355 A.

SUMMARY OF INVENTION

Accordingly, the invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, high stability to UV light and high stability to heat, or having a suitable balance regarding at least two of the characteristics. The invention also provides a liquid crystal display device including such a composition. The invention additionally provides an AM LCD device having characteristics such as a short response time, a large voltage holding ratio, a low threshold voltage, a large contrast ratio and a long service life.

The invention concerns a liquid crystal composition that has a negative dielectric anisotropy and contains at least one compound selected from the group consisting of compounds represented by formula (1) as a first component, and a liquid crystal display device including the composition:

(1)

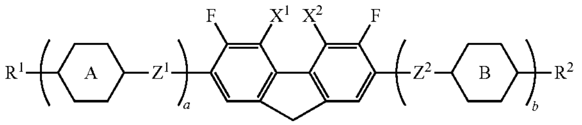

wherein in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A and ring B are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine; $Z^1$ and $Z^2$ are independently a single bond, ethylene, carbonyloxy or methyleneoxy; $X^1$ and $X^2$ are independently hydrogen or fluorine; a is 0, 1, 2 or 3; b is 0 or 1; and a sum of a and b is 3 or less.

The invention also concerns use of the liquid crystal composition in an LCD device.

The invention further concerns use of the liquid crystal composition in a PSA-mode LCD device.

The liquid crystal composition of the invention satisfies at least one of characteristics such as a high maximum temperature of a nematic phase, a low minimum temperature of the nematic phase, a small viscosity, a suitable optical anisotropy, a large negative dielectric anisotropy, a large specific resistance, high stability to UV light and high stability to heat, or has a suitable balance regarding at least two of the characteristics. The LCD device including such a composition has characteristics such as a short response time, a large voltage holding ratio, a low threshold voltage, a large contrast ratio and a long service life.

DESCRIPTION OF EMBODIMENTS

Usage of terms herein is as described below. The terms "liquid crystal composition" and "LCD device" may be occasionally abbreviated as "composition" and "device," respectively. "LCD device" is a generic term for an LCD panel and an LCD module. "Liquid crystal compound" is a generic term for a compound having a liquid crystal phase such as a nematic phase and a smectic phase, and a compound having no liquid crystal phase but being mixed with the composition for adjusting characteristics such as the temperature range of the nematic phase, viscosity and dielectric anisotropy. The compound has a six-membered ring such as 1,4-cyclohexylene or 1,4-phenylene, and has a rod-like molecular structure. "Polymerizable compound" includes a compound to be added to the composition for forming a polymer in the composition.

The liquid crystal composition is prepared by mixing a plurality of liquid crystal compounds. The proportion (content) of a liquid crystal compound is expressed in terms of weight percent (wt %) based on the weight of the liquid crystal composition. An additive such as an optically active compound, an antioxidant, a UV-light absorber, a dye, an antifoaming agent, a polymerizable compound, a polymerization initiator and a polymerization inhibitor is added to the liquid crystal composition, when necessary. The proportion (amount of addition) of the additive is expressed in terms of weight percent (wt %) based on the weight of the liquid crystal composition in a manner similar to the proportions of the liquid crystal compounds. Weight parts per million (ppm) may be occasionally used. The proportion of the polymerization initiator or the polymerization inhibitor is exceptionally expressed based on the weight of the polymerizable compound.

"Higher limit of the temperature range of a nematic phase" may be occasionally abbreviated as "maximum temperature." "Lower limit of the temperature range of a nematic phase" may be occasionally abbreviated as "minimum temperature." The expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. The expression "having a large voltage holding ratio" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. The expression "increases the dielectric anisotropy" means that the value positively increases for the composition having a positive Δ∈, and that the value negatively increases for the composition having a negative Δ∈.

A compound represented by formula (1) may be occasionally abbreviated as "compound (1)." At least one compound selected from the group consisting of compounds represented by formula (3) may be occasionally abbreviated as "compound (3)." An expression "compound (3)" means that the compound represented by formula (3) includes one compound, a mixture of two compounds, or a mixture of three or more compounds. This rule applies also to any other compound represented by any other formula. The expression "at least one of 'A'" means that the number of 'A' is arbitrary. The expression "at least one of 'A' may be replaced by 'B'" means that when the number of 'A' is 1, a position of 'A' is arbitrary, and when the number of 'A' is 2 or more, positions thereof can be selected without restriction. This rule applies also to the expression "at least one of 'A' is replaced by 'B'."

The symbol of a terminal group $R^1$ is used for a plurality of compounds in the chemical formulae of the component compounds. In the compounds, two groups represented by arbitrary two R' may be identical or different. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. This rule applies also to the symbol of any other terminal group or the like. In formula (1), when a is 2, two rings A exist. In the compound, two rings represented by the two rings A may be identical or different. This rule applies also to arbitrary two rings A when a is larger than 2. This rule applies also to other symbol such as $Z^1$ and ring C. This rule applies also to such a case where two $-Sp^2-P^5$ exists in compound (4-27).

A symbol A, B, C or the like surrounded by a hexagon corresponds to a six-membered ring A, B, C or the like. In compound (4), a hexagon represents a six-membered ring or a fused ring. An oblique line crossing the hexagon represents that arbitrary hydrogen on the ring can be replaced by $-Sp'-P^1$ group or the like. A subscript such as h represents the number of the substituent(s). When the subscript is 0, no such substitution exists. When h is 2 or more, a plurality of $-Sp^1-P^1$ exist on ring K. The plurality of groups represented by $-Sp'-P^1$ may be identical or different.

Then, 2-fluoro-1,4-phenylene means two divalent groups described below. In the chemical formula, fluorine may be leftward (L) or rightward (R). This rule applies also to other asymmetrical divalent group derived from a ring, such as tetrahydropyran-2,5-diyl. This rule applies also to a divalent bonding group such as carbonyloxy (—COO or —OCO—).

(L)

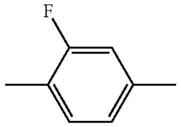

(R)

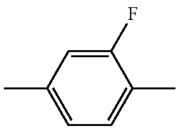

The invention includes the items described below.

Item 1 is a liquid crystal composition that has a negative dielectric anisotropy and contains at least one compound selected from the group consisting of compounds represented by formula (1) as a first component:

(1)

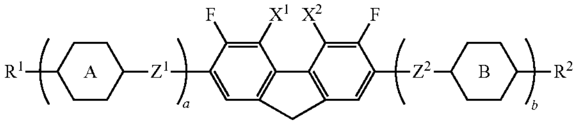

wherein in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A and ring B are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine; $Z^1$ and $Z^2$ are independently a single bond, ethylene, carbonyloxy or methyleneoxy; $X^1$ and $X^2$ are independently hydrogen or fluorine; a is 0, 1, 2 or 3; b is 0 or 1; the sum of a and b is 3 or less.

Item 2 is the liquid crystal composition of item 1 which contains at least one compound selected from the group consisting of compounds represented by formulae (1-1) to (1-9) as the first component:

(1-1)

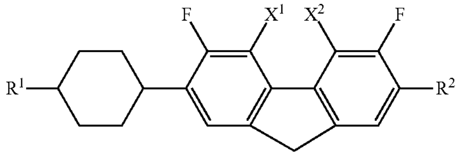

(1-2)

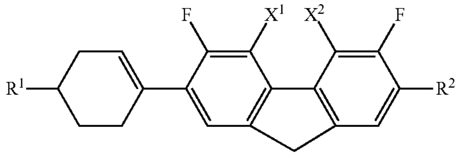

(1-3)

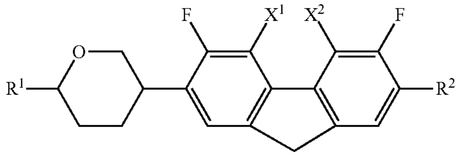

(1-4)

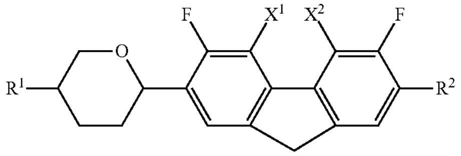

(1-5)

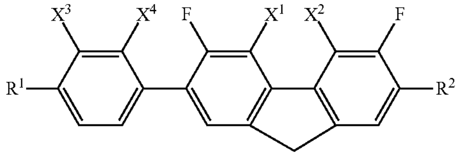

-continued (1-6)

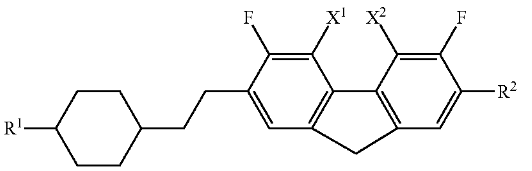

(1-7)

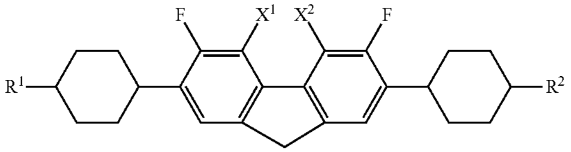

(1-8)

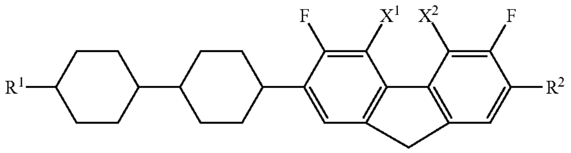

(1-9)

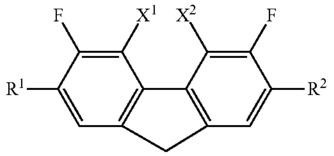

wherein in formulae (1-1) to (1-9), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; $X^1$, $X^2$, $X^3$ and $X^4$ are independently hydrogen or fluorine.

Item 3 is the liquid crystal composition of item 1 or 2 in which the proportion of the first component is in the range of 3-25 wt % based on the weight of the liquid crystal composition.

Item 4 is the liquid crystal composition of any one of items 1 to 3 which further contains at least one compound selected from the group consisting of compounds represented by formula (2) as a second component:

(2)

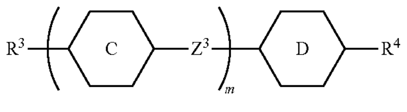

wherein in formula (2), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine; ring C and ring D are independently 1,4-cyclohexylene, 1,4-phenylene, 2-fluoro-1,4-phenylene or 2,5-difluoro-1,4-phenylene; $Z^3$ is a single bond, ethylene or carbonyloxy; and m is 1, 2 or 3.

Item 5 is the liquid crystal composition of item 4 which contains at least one compound selected from the group consisting of compounds represented by formulae (2-1) to (2-13) as the second component:

(2-1)

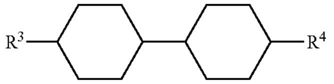

(2-2)

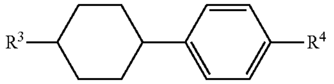

(2-3)

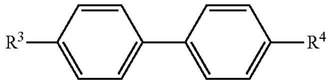

(2-4)

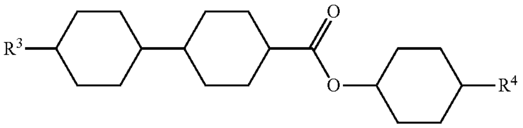

(2-5)

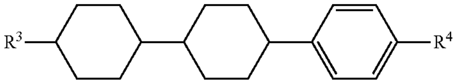

(2-6)

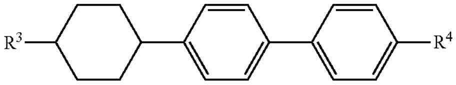

(2-7)

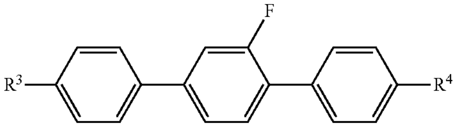

(2-8)

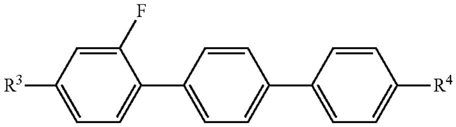

(2-9)

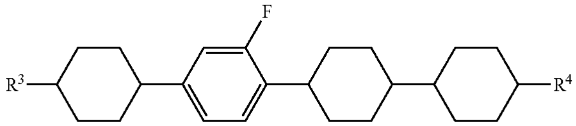

(2-10)

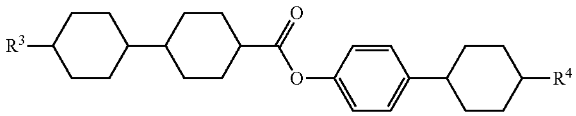

(2-11)

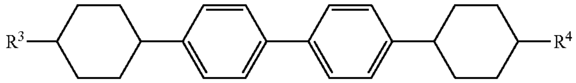

(2-12)

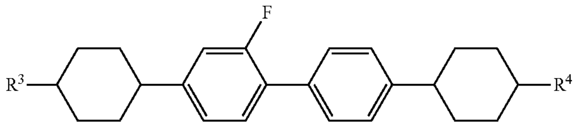

-continued (2-13)

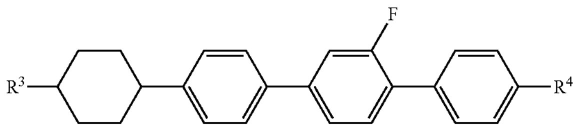

wherein in formulae (2-1) to (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

Item 6 is the liquid crystal composition of item 4 or 5 in which the proportion of the second component is in the range of 20-90 wt % based on the weight of the liquid crystal composition.

Item 7 is the liquid crystal composition of any one of items 1 to 6 which further contains at least one compound selected from the group consisting of compounds represented by formula (3) as a third component:

(3)

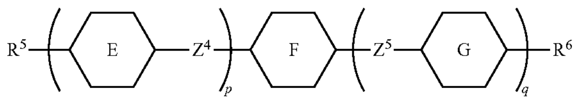

wherein in formula (3), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring E and ring G are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; p is 1, 2 or 3; q is 0 or 1; and the sum of p and q is 3 or less.

Item 8 is the liquid crystal composition of item 7 which contains at least one compound selected from the group consisting of compounds represented by formulae (3-1) to (3-19) as the third component:

(3-1)

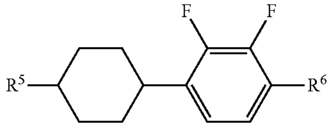

(3-2)

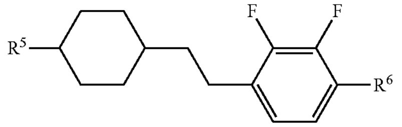

-continued (3-3)

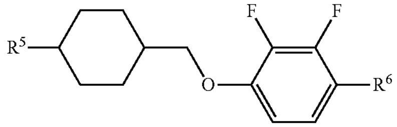

(3-4)

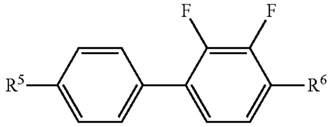

(3-5)

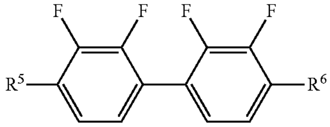

(3-6)

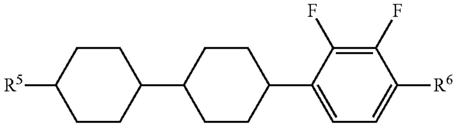

(3-7)

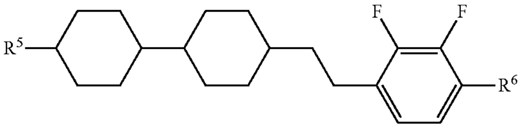

(3-8)

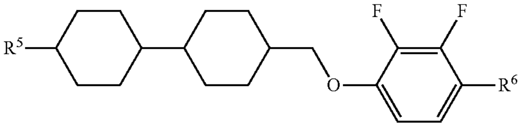

(3-9)

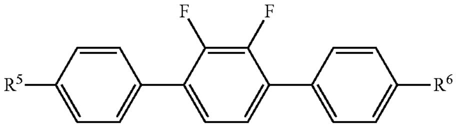

(3-10)

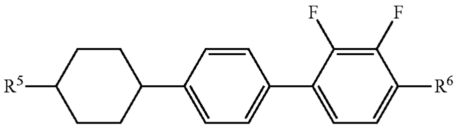

(3-11)

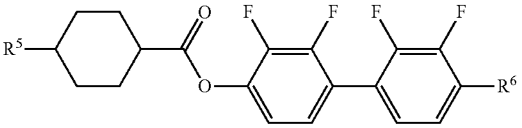

(3-12)

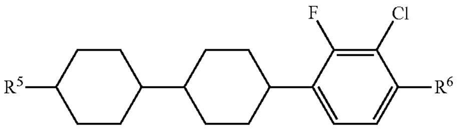

(3-13)

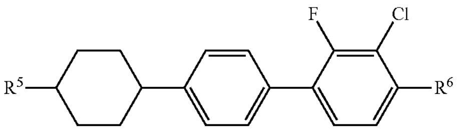

-continued (3-14)

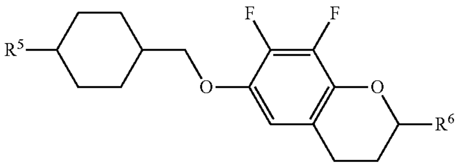

(3-15)

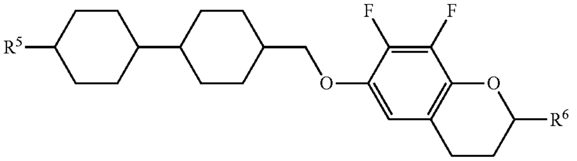

(3-16)

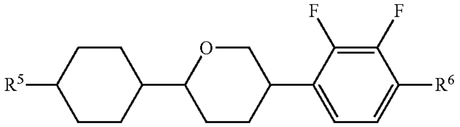

(3-17)

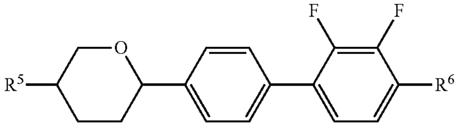

(3-18)

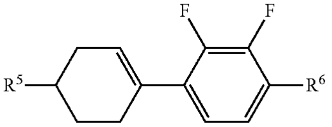

(3-19)

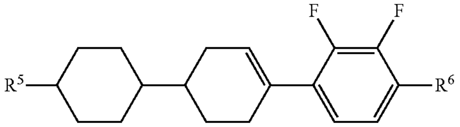

wherein in formulae (3-1) to (3-19), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

Item 9 is the liquid crystal composition of item 7 or 8 in which the proportion of the third component is in the range of 10-80 wt % based on the weight of the liquid crystal composition.

Item 10 is the liquid crystal composition of any one of items 1 to 9 which further contains at least one polymerizable compound selected from the group consisting of compounds represented by formula (4) as an additive component:

(4)

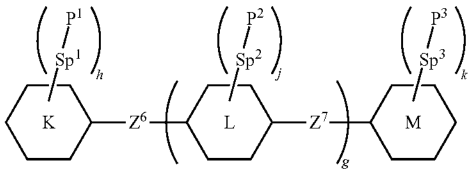

wherein in formula (4), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^7$ are independently a single bond or alkylene having 1 to 10 carbons, and in the alkylene, at least one $—CH_2—$ may be replaced by —O—, —CO—, —COO— or —OCO—, at least one $—CH_2—CH_2—$ may be replaced by —CH═CH—, $—C(CH_3)═CH—$, $—CH═C(CH_3)—$ or $—C(CH_3)═C(CH_3)—$, and in the alkylene and the groups obtained through the replacement, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one $—CH_2—$ may be replaced by —O—, —COO—, —OCO— or —OCOO—, at least one $—CH_2—CH_2—$ may be replaced by —CH═CH— or —C≡O—, and in the alkylene and the groups obtained through the replacement, at least one hydrogen may be replaced by fluorine or chlorine; g is 0, 1 or 2; h, j and k are independently 0, 1, 2, 3 or 4; and the sum of h, j and k is 1 or more.

Item 11 is the liquid crystal composition of item 10 in which in formula (4), $P^1$, $P^2$ and $P^3$ are independently a polymerizable group selected from the group consisting of groups represented by formulae (P-1) to (P-5):

(P-1)

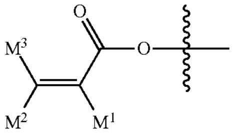

(P-2)

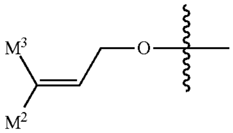

(P-3)

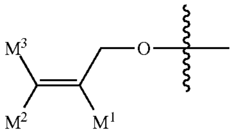

(P-4)

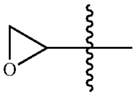

(P-5)

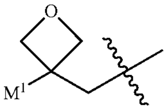

wherein in formulae (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

Item 12 is the liquid crystal composition of item 10 or 11 which contains at least one polymerizable compound selected from the group consisting of compounds represented by formulae (4-1) to (4-27) as the additive component:

(4-1)

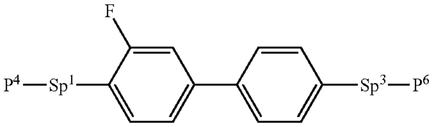

(4-2)

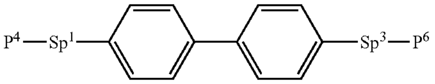

(4-3)

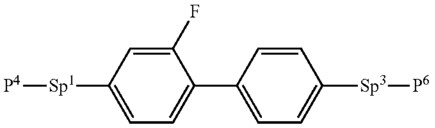

(4-4)

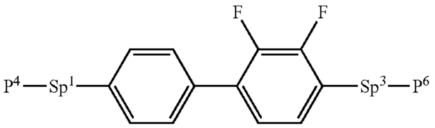

(4-5)

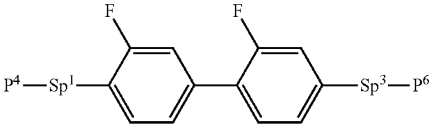

(4-6)

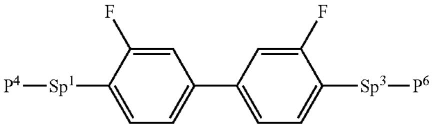

(4-7)

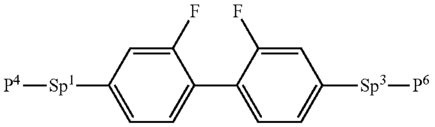

(4-8)

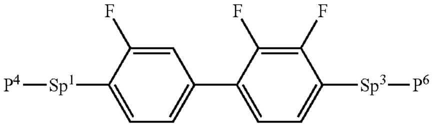

(4-9)

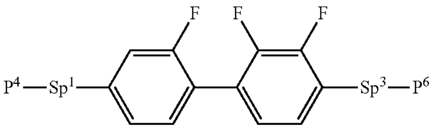

(4-10)

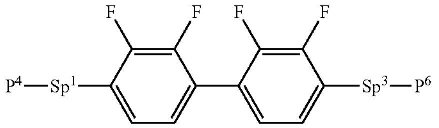

-continued (4-11)

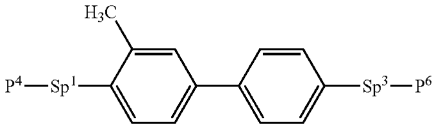

(4-12)

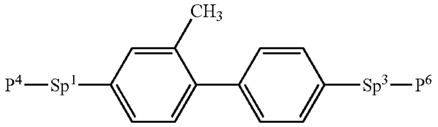

(4-13)

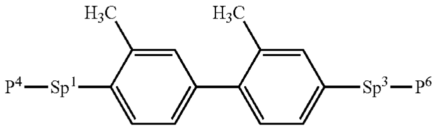

(4-14)

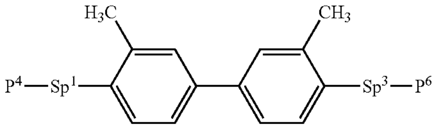

(4-15)

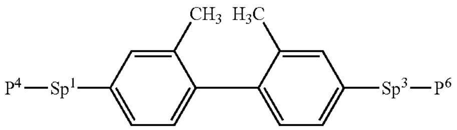

(4-16)

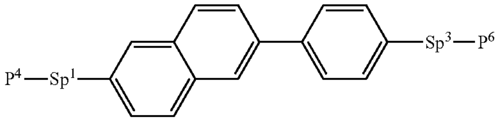

(4-17)

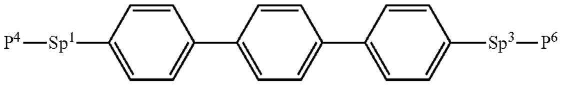

(4-18)

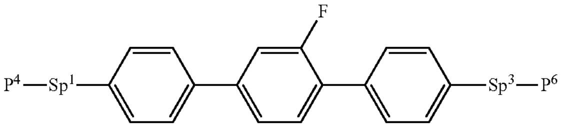

(4-19)

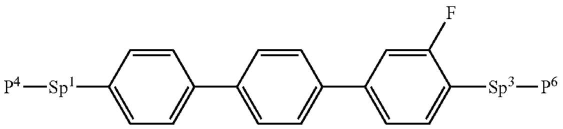

(4-20)

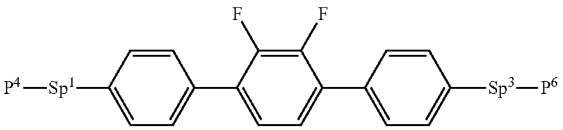

(4-21)

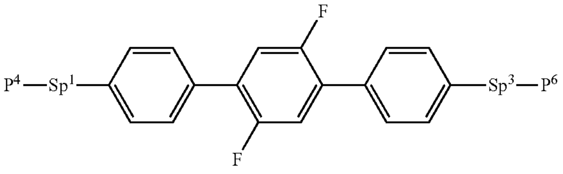

-continued (4-22)

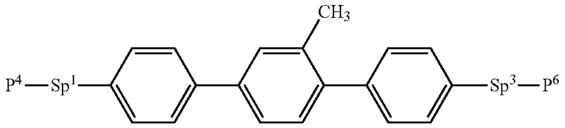

(4-23)

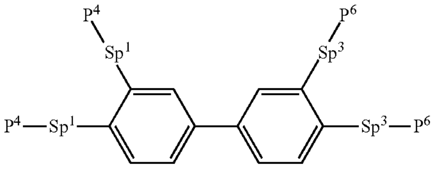

(4-24)

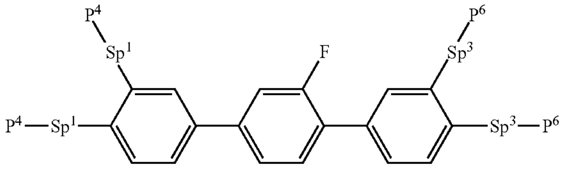

(4-25)

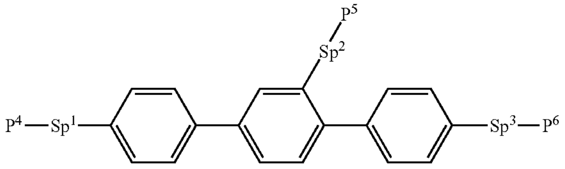

(4-26)

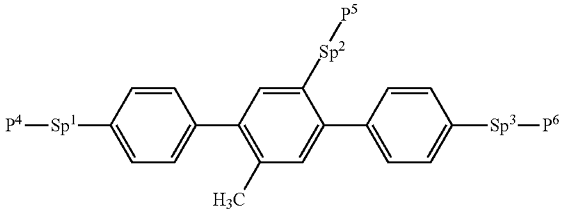

(4-27)

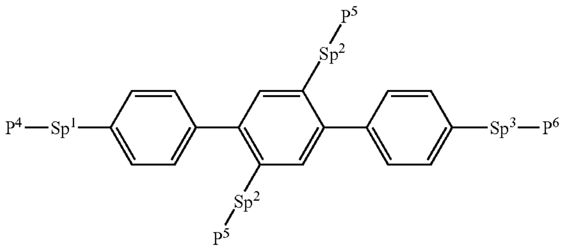

wherein in formulae (4-1) to (4-27), $P^4$, $P^5$ and $P^6$ are independently a polymerizable group selected from the group consisting of groups represented by formula (P-1) to formula (P-3);

(P-1)

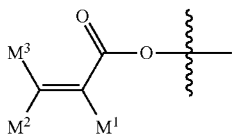

-continued (P-2)

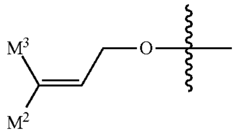

(P-3)

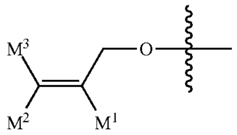

wherein in formulae (P-1) to (P-3), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

and in formulae (4-1) to (4-27), $Sp^1$, $Sp^2$ and $Sp^3$ are independently a single bond or alkylene having 1 to 10 carbons, and in the alkylene, at least one $—CH_2—$ may be replaced by —O—, —COO—, —OCO— or —OCOO—, at least one $—CH_2—CH_2—$ may be replaced by —CH═CH— or —C≡C—, and in the alkylene and the groups obtained through the replacement, at least one hydrogen may be replaced by fluorine or chlorine.

Item 13 of the liquid crystal composition of any one of items 10 to 12 in which the proportion of addition of the additive component is in the range of 0.03 wt % to 10 wt % based on the weight of the liquid crystal composition.

Item 14 is an LCD device which includes the liquid crystal composition of any one of items 1 to 13.

Item 15 is the LCD device of item 14 of which the operating mode is an IPS mode, a VA mode, an FFS mode or an FPA mode and the driving mode is an active matrix mode.

Item 16 is a PSA-mode LCD device which includes the liquid crystal composition of any one of items 10 to 13, or a composition obtained by polymerizing the polymerizable compound in the liquid crystal composition.

Item 17 is use of the liquid crystal composition of any one of items 1 to 13 in an LCD device.

Item 18 is use of the liquid crystal composition of any one of items 10 to 13 in a PSA-mode LCD device.

The invention further includes the following items: a) the composition further containing at least one additive such as an optically active compound, an antioxidant, a UV-light absorber, a dye, an antifoaming agent, a polymerizable compound, a polymerization initiator and a polymerization inhibitor; b) an AM device including the composition; c) the composition further containing a polymerizable compound, and a PSA-mode AM device including the composition; d) a PSA-mode AM device including the composition in which the polymerizable compound has been polymerized; e) a device including the composition and having the PC, TN, STN, ECB, OCB, IPS, VA, FFS or FPA mode; f) a transmissive device including the composition; g) use of the composition as the composition having a nematic phase; and h) use as an optically activity composition by adding an optically active compound to the composition.

The composition of the invention will be described in the following order. First, the constitution of the component compounds in the composition is described. Second, main characteristics of the component compounds and main effects of the compounds on the composition are described.

Third, the combination of components in the composition, preferred proportions of the components and the basis thereof are described. Fourth, preferred embodiments of the component compounds are described. Fifth, preferred component compounds are shown. Sixth, the additive that may be added to the composition is described. Seventh, methods for synthesizing the component compounds are described. Last, the application of the composition is described.

First, the constitution of the component compounds in the composition is described. The composition of the invention is classified into composition A and composition B. Composition A may further contain any other liquid crystal compound, additive or the like in addition to the liquid crystal compound selected from compounds (1), (2) and (3). "Any other liquid crystal compound" means a liquid crystal compound different from compounds (1), (2) and (3). Such a compound is mixed with the composition for further adjusting the characteristics. The additives include an optically active compound, an antioxidant, a UV-light absorber, a dye, an antifoaming agent, a polymerizable compound, a polymerization initiator and a polymerization inhibitor.

Composition B consists essentially of the liquid crystal compound selected from compounds (1), (2) and (3). The term "essentially" means that the composition may contain the additive, but does not contain any other liquid crystal compound. Composition B has a smaller number of components than composition A has. Composition B is preferred to composition A in view of cost reduction. Composition A is preferred to composition B in view of the possibility of further adjusting the characteristics by mixing any other liquid crystal compound.

Second, the main characteristics of the component compounds and the main effects of the compounds on the characteristics of the composition are described. The main characteristics of the component compounds are summarized in Table 2 on the basis of the advantageous effects of the invention. In Table 2, the symbol L stands for "large" or "high," the symbol M stands for "medium," and the symbol S stands for "small" or "low." The symbols L, M and S represent a classification based on a qualitative comparison among the component compounds, and 0 (zero) means that the value is zero or close to zero."

TABLE 2

Characteristics of Compounds

| Compounds | Compound (1) | Compound (2) | Compound (3) |
|---|---|---|---|
| Maximum temperature | S to M | S to L | S to L |
| Viscosity | L | S to M | M to L |
| Optical anisotropy | M to L | S to L | M to L |
| Dielectric anisotropy | L[1)] | 0 | M to L[1)] |
| Specific resistance | L | L | L |

[1)]Compounds having a negative dielectric anisotropy value.

Upon mixing the component compounds with the composition, the main effects of the component compounds on the characteristics of the composition are as described below. Compound (1) increases $\Delta\in$. Compound (2) increases the maximum temperature or decreases the viscosity. Compound (3) increases the dielectric anisotropy and decreases the minimum temperature. Compound (4) is polymerized to give a polymer, and the polymer shortens the response time of the device and reduces image persistence.

Third, the combination of components in the composition, preferred proportions of the components and the basis thereof are described. Preferred combinations of the components in the composition include a combination of the first and the second components, a combination of the first, the second and the third components, a combination of the first, the second and the additive components, or a combination of the first, the second, the third and the additive components. Further preferred combinations include the combination of the first, the second and the third components or the combination of the first, the second, the third and the additive components.

A preferred proportion of the first component is about 3 wt % or more in order to increase the dielectric anisotropy and about 25 wt % or less for decreasing the minimum temperature. A further preferred proportion is in the range of about 3 wt % to about 20 wt %. A particularly preferred proportion is in the range of about 3 wt % to about 15 wt %.

A preferred proportion of the second component is about 20 wt % or more for increasing the maximum temperature or decreasing the viscosity, and about 90 wt % or less for increasing the dielectric anisotropy. A further preferred proportion is in the range of about 30 wt % to about 80 wt %. A particularly preferred proportion is in the range of about 35 wt % to about 75 wt %.

A preferred proportion of the third component is about 10 wt % or more for increasing the dielectric anisotropy, and about 80 wt % or less for decreasing the minimum temperature. A further preferred proportion is in the range of about 20 wt % to about 70 wt %. A particularly preferred proportion is in the range of about 25 wt % to about 65 wt %.

Compound (4) is added to the composition for adapting the composition to a PSA-mode device. A preferred proportion of the additive is about 0.03 wt % or more in order to align the liquid crystal molecules, and about 10 wt % or less in order to prevent poor display in the device. A further preferred proportion is in the range of about 0.1 wt % to about 2 wt %. A particularly preferred proportion is in the range of about 0.2 wt % to about 1.0 wt %.

Fourth, the preferred embodiments of the component compounds are described. In formulae (1), (2) and (3), $R^1$, $R^2$, $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine. Preferred $R^1$, $R^2$, $R^5$ or $R^6$ is alkyl having 1 to 12 carbons for increasing the stability, or is alkoxy having 1 to 12 carbons for increasing the dielectric anisotropy. $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine. Preferred $R^3$ or $R^4$ is al kenyl having 2 to 12 carbons for decreasing the viscosity, or is alkyl having 1 to 12 carbons for increasing the stability. Alkyl is straight-chain alkyl or branched-chain alkyl, but includes no cyclic alkyl. Straight-chain alkyl is preferred to branched-chain alkyl. The same rule applies also to a terminal group such as alkoxy and alkenyl.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. The preferred configuration of —CH=CH— in the alkenyl depends on the position of the double bond. Trans is preferred in alkenyl such as 1-propenyl, 1-butenyl, 1-pentenyl, 1-hexenyl, 3-pentenyl and 3-hexenyl for decreasing the viscosity or the like. Cis is preferred in alkenyl such as 2-butenyl, 2-pentenyl and 2-hexenyl.

Preferred examples of alkyl in which at least one hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl and 8-fluorooctyl. Further preferred examples include 2-fluoroethyl, 3-fluoropropyl, 4-fluorobutyl and 5-fluoropentyl for increasing the dielectric anisotropy.

Preferred examples of alkenyl in which at least one hydrogen is replaced by fluorine or chlorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Ring A and ring B are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine. Preferred examples of “1,4-phenylene in which at least one hydrogen is replaced by fluorine or chlorine” include 2-fluoro-1,4-phenylene, 2,3-difluoro-1,4-phenylene and 2-chloro-3-fluoro-1,4-phenylene. Preferred ring A or ring B is 1,4-cyclohexylene for decreasing the viscosity, or is 1,4-phenylene for increasing the optical anisotropy. With regard to the configuration of 1,4-cyclohexylene, trans is preferred to cis for increasing the maximum temperature. Tetrahydropyran-2,5-diyl includes:

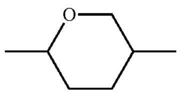 or 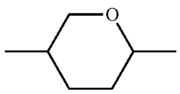, and preferably

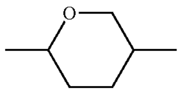.

Ring C and ring D are independently 1,4-cyclohexylene, 1,4-phenylene, 2-fluoro-1,4-phenylene or 2,5-difluoro-1,4-phenylene. Preferred ring C or ring D is 1,4-cyclohexylene for decreasing the viscosity or increasing the maximum temperature, or is 1,4-phenylene for decreasing the minimum temperature.

Ring E and ring G are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine. Preferred ring E or ring G is 1,4-cyclohexylene for decreasing the viscosity, or is tetrahydropyran-2,5-diyl for increasing the dielectric anisotropy, or is 1,4-phenylene for increasing the optical anisotropy.

Ring F includes 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring F is 2,3-difluoro-1,4-phenylene for decreasing the viscosity, or is 2-chloro-3-fluoro-1,4-phenylene for decreasing the optical anisotropy, or is 7,8-difluorochroman-2,6-diyl for increasing the dielectric anisotropy.

$Z^1$, $Z^2$, $Z^4$ and $Z^5$ are independently a single bond, ethylene, carbonyloxy or methyleneoxy. Preferred $Z^1$, $Z^2$, $Z^4$ or $Z^5$ is a single bond for decreasing the viscosity, or is ethylene for decreasing the minimum temperature, or is methyleneoxy for increasing the dielectric anisotropy. $Z^3$ is a single bond, ethylene or carbonyloxy. Preferred $Z^3$ is a single bond for increasing the stability.

$X^1$, $X^2$, $X^3$ and $X^4$ are independently hydrogen or fluorine. Preferred $X^1$, $X^2$, $X^3$ or $X^4$ is fluorine for increasing $\Delta\epsilon$.

Then, a is 0, 1, 2 or 3, b is 0 or 1, and the sum of a and b is 3 or less. Preferred a is 0 or 1 for decreasing the viscosity, or is 2 or 3 for increasing the maximum temperature. Preferred b is 0 for decreasing the viscosity, or is 1 for decreasing the minimum temperature. Then, m is 1, 2 or 3. Preferred m is 1 for decreasing the viscosity, or is 2 or 3 for increasing the maximum temperature. Then, p is 1, 2 or 3, q is 0 or 1, and the sum of p and q is 3 or less. Preferred p is 1 for decreasing the viscosity, or is 2 or 3 for increasing the maximum temperature. Preferred q is 0 for decreasing the viscosity, or is 1 for decreasing the minimum temperature.

In formula (4), $P^1$, $P^2$ and $P^3$ are independently a polymerizable group. Preferred $P^1$, $P^2$ or $P^3$ is a polymerizable group selected from the group consisting of groups represented by formulae (P-1) to (P-5). Further preferred $P^1$, $P^2$ or $P^3$ is the group represented by formula (P-1), (P-2) or (P-3). Particularly preferred $P^1$, $P^2$ or $P^3$ is the group represented by formula (P-1) or (P-2). Most preferred $P^1$, $P^2$, or $P^3$ is the group represented by formula (P-1). A preferred group represented by formula (P-1) is —OCO—CH=$CH_2$ or —OCO—C($CH_3$)=$CH_2$. A wavy line in formulae (P-1) to (P-5) indicates the site to be bonded.

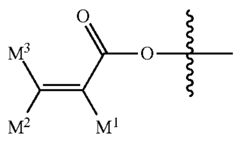
(P-1)

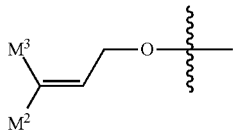
(P-2)

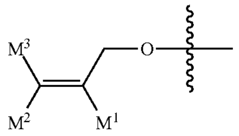
(P-3)

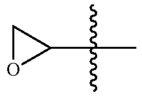
(P-4)

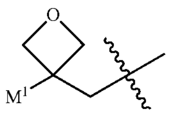
(P-5)

In formulae (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine. Preferred $M^1$, $M^2$ or $M^3$ is hydrogen or methyl in order to increase reactivity. Further preferred $M^1$ is hydrogen or methyl, and further preferred $M^2$ or $M^3$ is hydrogen.

$Sp^1$, $Sp^2$ and $Sp^a$ are independently a single bond or alkylene having 1 to 10 carbons, and in the alkylene, at least one $—CH_2—$ may be replaced by —O—, —COO—, —OCO— or —OCOO—, at least one $—CH_2—CH_2—$ may be replaced by —CH═CH— or —C≡C—, and in the alkylene and the groups obtained through the replacement, at least one hydrogen may be replaced by fluorine or chlorine. Preferred $Sp^1$, $Sp^2$ or $Sp^3$ is a single bond, $—CH_2CH_2—$, $—CH_2O—$, $—OCH_2—$, —COO—, —OCO—, —CO—CH═CH— or —CH═CH—CO—. Further preferred $Sp^1$, $Sp^2$ or $Sp^3$ is a single bond.

Ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring K or ring M is phenyl. Ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine. Preferred ring L is 1,4-phenylene or 2-fluoro-1,4-phenylene.

$Z^6$ and $Z^7$ are independently a single bond or alkylene having 1 to 10 carbons, and in the alkylene, at least one $—CH_2—$ may be replaced by —O—, —CO—, —OCO— or —OCO—, and at least one $—CH_2—CH_2—$ may be replaced by —CH═CH—, $—C(CH_3)═CH—$, $—CH═C(CH_3)—$ or $—C(CH_3)═C(CH_3)—$, and in the alkylene and the groups obtained through the replacement, at least one hydrogen may be replaced by fluorine or chlorine. Preferred $Z^6$ or $Z^7$ is a single bond, $—CH_2CH_2—$, $—CH_2O—$, $—OCH_2—$, —OCO—, or —OCO—. Further preferred $Z^6$ or $Z^7$ is a single bond.

Then, g is 0, 1 or 2. Preferred g is 0 or 1. Then, h, j and k are independently 0, 1, 2, 3 or 4, and the sum of h, j and k is 1 or more. Preferred h, j or k is 1 or 2.

Fifth, preferred component compounds are shown. Preferred compound (1) includes compounds (1-1) to (1-9) as described in item 2. It is preferred that at least one compound in the first component is compound (1-1), (1-2), (1-3) or (1-6) among the compounds. It is also preferred that at least two compounds in the first components are a combination of compounds (1-1) and (1-2), a combination of compounds (1-1) and (1-3), or a combination of compounds (1-1) and (1-6).

Preferred compounds (2) include compounds (2-1) to (2-13) as described in item 5. It is preferred that at least one compound in the second component is compound (2-1), (2-2), (2-3), (2-5), (2-6), (2-7) or (2-13) among the compounds. It is also preferred that at least two compounds in the second component are a combination of compounds (2-1) and (2-5), a combination of compounds (2-1) and (2-6), a combination of compounds (2-3) and (2-5), or a combination of compounds (2-3) and (2-6).

Preferred compounds (3) include compounds (3-1) to (3-19) as described in item 8. It is preferred that at least one compound in the third components is compound (3-1), (3-2), (3-3), (3-4), (3-6), (3-7), (3-8) or (3-10) among the compounds. It is also preferred that at least two compounds in the third component are a combination of compounds (3-1) and (3-6), a combination of compounds (3-1) and (3-10), a combination of compounds (3-3) and (3-6), a combination of compounds (3-3) and (3-10), a combination of compounds (3-4) and (3-6), or a combination of compounds (3-4) and (3-10).

Preferred compounds (4) include compounds (4-1) to (4-27) as described in item 12. It is preferred that at least one compound in the additive component is compound (4-1), (4-2), (4-24), (4-25), (4-26) or (4-27) among the compounds. It is also preferred that at least two compounds in the additive component are a combination of compounds (4-1) and (4-2), a combination of compounds (4-1) and (4-18), a combination of compounds (4-2) and (4-24), a combination of compounds (4-2) and (4-25), a combination of compounds (4-2) and (4-26), a combination of compounds (4-25) and (4-26) or a combination of compounds (4-18) and (4-24).

Sixth, the additives that may be added to the composition are described. Such additives include an optically active compound, an antioxidant, a UV-light absorber, a dye, an antifoaming agent, a polymerizable compound, a polymerization initiator, a polymerization inhibitor and so on. The optically active compound is added to the composition for inducing a helical structure in the liquid crystal to give a twist angle. Examples thereof include compounds (5-1) to (5-5). A preferred proportion of the optically active compound is about 5 wt % or less. A further preferred proportion is in a range of about 0.01 wt % to about 2 wt %.

(5-1)

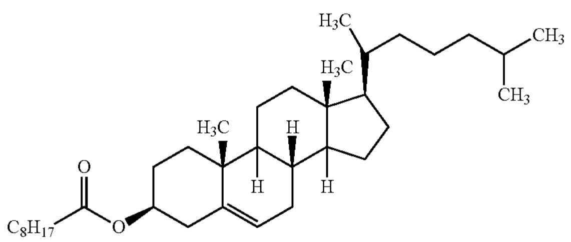

(5-2)

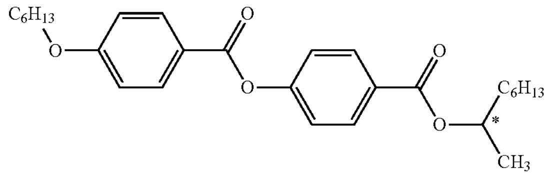

(5-3)

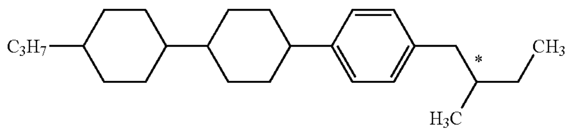

-continued (5-4)

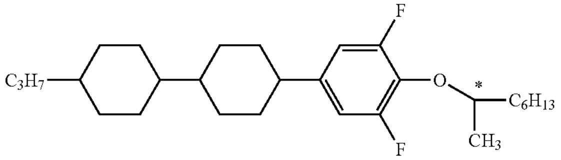

(5-5)

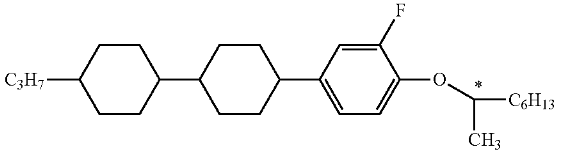

The antioxidant is added to the composition for preventing a decrease in the specific resistance caused by heating in air, or maintaining a large voltage holding ratio at room temperature and also at a temperature close to the maximum temperature even after the device has been used for a long period of time. Preferred examples of the antioxidant include compound (6) and so forth where n is an integer from 1 to 9.

(6)

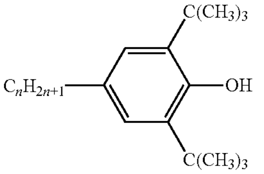

In compound (6), preferred n is 1, 3, 5, 7 or 9. Further preferred n is 7. Compound (6) of n=7 is effective in maintaining a large voltage holding ratio at room temperature and also at a temperature close to the maximum temperature even after the device has been used for a long period of time because such compound (6) has a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

Preferred examples of the UV-light absorber include a benzophenone derivative, a benzoate derivative and a triazole derivative. A light stabilizer such as an amine having steric hindrance is also preferred. A preferred proportion of the UV-light absorber or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is added to the composition to adapt the composition to a device having a guest host (GH) mode. A preferred proportion of the dye is in the range of about 0.01 wt % to about 10 wt %. The antifoaming agent such as dimethyl silicone oil or methyl phenyl silicone oil is added to the composition for preventing foam formation. A preferred proportion of the antifoaming agent is about 1 ppm or more for achieving the effect thereof, and about 1,000 ppm or less for preventing the poor display. A further preferred proportion is in the range of about 1 ppm to about 500 ppm.

The polymerizable compound is used to adapt the composition to a PSA-mode device. Compound (4) is suitable for the purpose. Any other polymerizable compound that is different from compound (4) may be added to the composition together with compound (4) or instead of compound (4). Preferred examples of the polymerizable compounds include an acrylate, a methacrylate, a vinyl compound, a vinyloxy compound, propenyl ether, an epoxy compound (oxirane and oxetane) and a vinyl ketone compound. Further preferred examples include an acrylate derivative and a methacrylate derivative. A preferred proportion of compound (4) is about 10 wt % or more based on the total weight of the polymerizable compound. A further preferred proportion is about 50 wt % or more. A particularly preferred proportion is about 80 wt % or more. A most preferred proportion is about 100 wt %.

The polymerizable compound such as compound (4) is polymerized by irradiation with UV light, and may be polymerized in presence of a suitable initiator such as a photopolymerization initiator. Suitable conditions for polymerization, suitable types of the initiator and suitable amounts thereof are known to those of ordinary skill in the art and are described in literature. For example, Irgacure 651™ (BASF), Irgacure 184™ (BASF) or Darocur 1173™ (BASF), each being a photoinitiator, is suitable for radical polymerization. A preferred proportion of the photopolymerization initiator is in the range of about 0.1 wt % to about 5 wt % based on the total weight of the polymerizable compound. A further preferred proportion is in the range of about 1 wt % to about 3 wt % based thereon.

When a polymerizable compound such as compound (4) is stored, a polymerization inhibitor may be added thereto in order to prevent polymerization. The polymerizable compound is ordinarily added to the composition without removing the polymerization inhibitor. Examples of the polymerization inhibitor include hydroquinone, a hydroquinone derivative such as methylhydroquinone, 4-tert-butylcatechol, 4-methoxyphenol and phenothiazine.

Seventh, the methods for synthesizing the component compounds are described. The compounds can be prepared by known methods. Examples of the synthetic methods are provided below. Compound (2-1) may be prepared by the method described in JP S59-176221 A. Compound (3-1) may be prepared by the method described in JP H2-503441 A. Compound (4-18) may be prepared by the method described in JP H7-101900 A. The antioxidant may be commercially available. A compound represented by formula (6) of n=1 is available from Sigma-Aldrich. Compound (6) of n=7 and so on are prepared with the method described in U.S. Pat. No. 3,660,505 B. Compound (1-1) is prepared by the method described below.

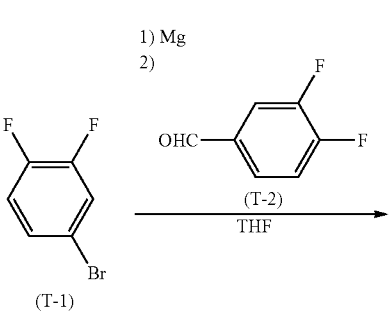

(T-1)

-continued

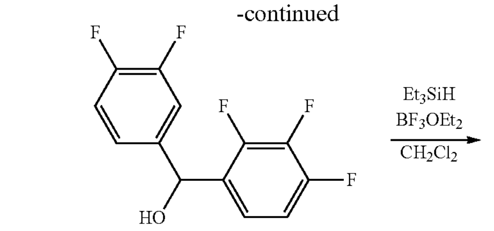

(T-3)

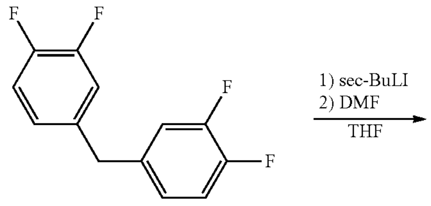

(T-4)

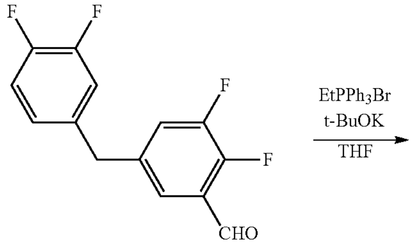

(T-5)

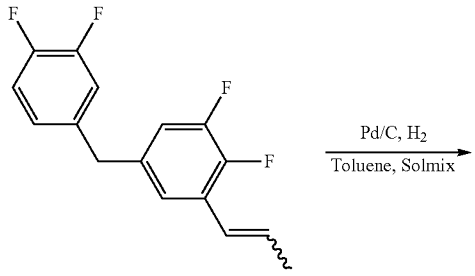

(T-6)

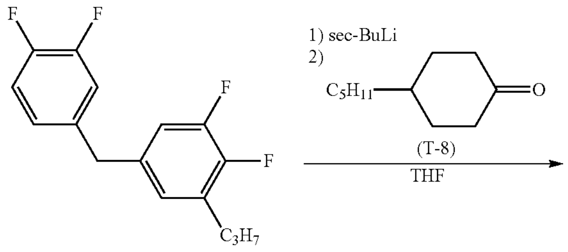

(T-7)

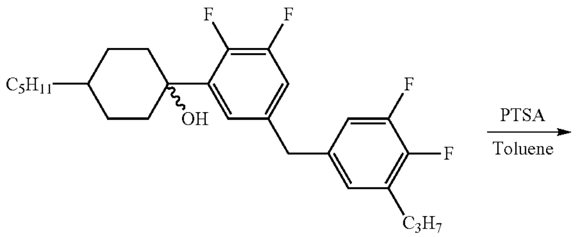

(T-9)

-continued

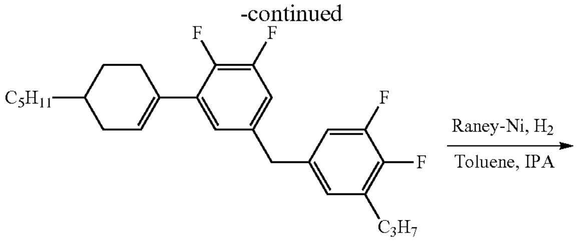

(T-10)

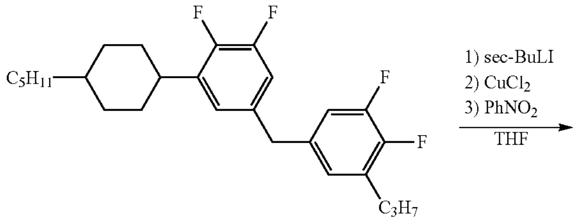

(T-11)

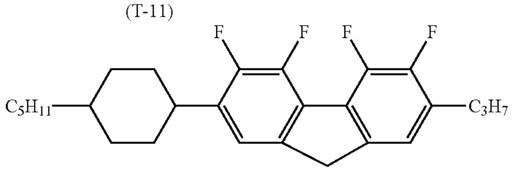

(1-1)

First Step

Under a nitrogen atmosphere, magnesium (20.8 g) and THF (30.0 mL) were put in a reaction vessel and heated to 45° C. Then, a THF (150 mL) solution of compound (T−1) (150 g) were slowly added thereto in a temperature range of 45° C. to 55° C., and the resulting solution was stirred for 2 hours. Next, the solution was cooled down to 0° C., a THF (200 mL) solution of compound (T-2) (127 g) was slowly added thereto, and the resulting solution was stirred for 2 hours while returning the solution to room temperature. The reaction mixture was poured into a saturated aqueous solution of ammonium chloride, and the aqueous layer was subjected to extraction using ethyl acetate. The combined organic layer was washed with water, and dried over anhydrous magnesium sulfate. The solution was concentrated under a reduced pressure, and the residue was purified by silica gel chromatography (toluene: ethyl acetate-10:1 in volume ratio) to give compound (T-3) (188 g; 95%).

Second Step

Under a nitrogen atmosphere, compound (T-3) (188 g) and dichloromethane (750 mL) were put in a reaction vessel and cooled down to −50° C. Then, a triethylsilane (140 mL) and boron trifluoride diethyl ether complex (205 mL) was slowly added thereto, and the resulting solution was stirred for 12 hours while returning the solution to room temperature. The reaction mixture was poured into ice water, and the aqueous layer was subjected to extraction using dichloromethane. The combined organic layer was washed with water, and dried over anhydrous magnesium sulfate. The solution was concentrated under a reduced pressure, and the residue was purified by silica gel chromatography (heptane) to give compound (T-4) (145 g; 82%).

Third Step

Under a nitrogen atmosphere, compound (T-4) (120 g) and THF (1,200 mL) were put in a reaction vessel and cooled down to −70° C. Then, sec-butyl lithium (1.01 M; cyclohexane, an n-hexane solution; 500 mL) was slowly added thereto and the resulting solution was stirred for 1 hour. Next, DMF (77.4 mL) was slowly added thereto, and the resulting solution was stirred for 12 hours while returning the solution to room temperature. The reaction mixture was poured into a saturated aqueous solution of ammonium chloride, and the aqueous layer was subjected to extraction using toluene. The combined organic layer was washed with brine, and dried over anhydrous magnesium sulfate. The solution was concentrated under a reduced pressure, and the residue was purified by silica gel chromatography (heptane: toluene=1:1 in volume ratio) to give compound (T-5) (57.2 g; 43%).

Fourth Step

Under a nitrogen atmosphere, ethyltriphenylphosphonium bromide (286 g) and THF (850 mL) were put in a reaction vessel, and cooled down to −30° C. Then, potassium t-butoxide (82.8 g) was slowly added thereto, and the resulting solution was stirred for 30 minutes. Next, a THF (800 mL) solution of compound (T-5) (165 g) was slowly added thereto, and the resulting solution was stirred for 2 hours while returning the solution to room temperature. The reaction mixture was poured into water, and the aqueous layer was subjected to extraction using toluene. The combined organic layer was washed with brine, and dried over anhydrous magnesium sulfate. The solution was concentrated under a reduced pressure, and the residue was purified by silica gel chromatography (heptane) to give compound (T-6) (172 g; 100%).

Fifth Step

Compound (T-6) (172 g), a palladium carbon catalyst (5% Pd/C NX type (50%, wet); 8.62 g, made by N.E. Chemcat Corporation), toluene (500 mL) and Solmix (registered trade name, Japan Alcohol Trading Co., Ltd.) A-11 (500 mL) were put in a reaction vessel, and the resulting solution was stirred for 12 hours under a hydrogen atmosphere. After removing the catalyst by filtration, the solution was concentrated under a reduced pressure, and the residue was purified by silica gel chromatography (heptane) to give compound (T-7) (170 g; 98%).

Sixth Step

Under a nitrogen atmosphere, compound (T-7) (135 g) and THF (1,000 mL) were put in a reaction vessel, and cooled down to −70° C. Then, sec-butyl lithium (1.01 M; cyclohexane, an n-hexane solution; 500 mL) was slowly added thereto and the resulting solution was stirred for 1 hour. Next, a THF (350 mL) solution of compound (T-8) (96.6 g) was slowly added thereto, and the resulting solution was stirred for 3 hours while returning the solution to room temperature. The reaction mixture was poured into a saturated aqueous solution of ammonium chloride, and the aqueous layer was subjected to extraction using ethyl acetate. The combined organic layer was washed with brine, and dried over anhydrous magnesium sulfate. The solution was concentrated under a reduced pressure to give compound (T-9) (215 g; 100%).

Seventh Step

Under a nitrogen atmosphere, compound (T-9) (215 g), PTSA (p-toluenesulfonic acid monohydrate) (6.47 g) and toluene (1,000 mL) were put in a reaction vessel, and subjected to reflux under heating for 1 hour while removing distilled water. Then, the reaction mixture was washed with water, and dried over anhydrous magnesium sulfate. The solution was concentrated under a reduced pressure, and the residue was purified by silica gel chromatography (heptane) to give compound (T-10) (244 g; 87%).

Eighth Step

Compound (T-10) (244 g), Raney nickel (24.4 g), toluene (200 mL) and IPA (200 mL) were put in a reaction vessel, and the resulting solution was stirred for 24 hours under a hydrogen atmosphere. After removing the catalyst by filtration, the solution was concentrated under a reduced pressure, and the residue was purified by silica gel chromatography (heptane) to give compound (T-11) (236 g; 96%).

Ninth Step

Under a nitrogen atmosphere, compound (T-11) (50.0 g) and THF (2,500 mL) were put in a reaction vessel, and cooled down to −70° C. Then, sec-butyl lithium (1.07 M; cyclohexane, an n-hexane solution; 237 mL) was slowly added thereto and the resulting solution was stirred for 2 hours. Next, copper(II) chloride (35.6 g) was slowly added thereto, and the resulting solution was stirred for 1 hour. Thereafter, nitrobenzene (28.6 mL) was slowly added thereto and the resulting solution was stirred for 12 hours while returning the solution to room temperature. The reaction mixture was poured into a saturated aqueous solution of ammonium chloride, and the aqueous layer was subjected to extraction using ethyl acetate. The combined organic layer was washed with brine, and dried over anhydrous magnesium sulfate. The solution was concentrated under a reduced pressure, and the residue was purified by silica gel chromatography (heptane). Then, the residue was purified furthermore through recrystallization from a mixed solvent of heptane and IPA (1:1 in volume ratio) to give compound (1-1) (7.83 g; 16%).

Chemical shift δ (ppm; $CDCl_3$): 7.10 (d, J=5.4 Hz, 1H). 7.05 (d, J=5.6 Hz, 1H), 3.85 (s, 2H), 2.89 (tt, J=12.2 Hz, J=3.0 Hz, 1H), 2.69 (t, J=7.6 Hz, 2H), 1.95-1.85 (m, 4H), 1.73-1.63 (m, 2H), 1.55-1.44 (m, 2H), 1.38-1.20 (m, 9H), 1.17-1.05 (m, 2H), 0.98 (t, J=7.3 Hz, 3H), 0.91 (t, J=7.3 Hz, 3H).

Any compounds whose synthetic methods are not described above can be prepared with the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared with a publicly known method using the thus obtained compounds. For example, the component compounds are mixed and dissolved in each other by heating.

Last, the application of the composition is described. Most of the composition has a minimum temperature of about −10° C. or lower, a maximum temperature of about 70° C. or higher, and an optical anisotropy in the range of about 0.07 to about 0.20. The composition having an optical anisotropy in the range of about 0.08 to about 0.25 may be prepared by controlling the ratio of the component compounds or by mixing other liquid crystal compound. Further the composition having an optical anisotropy in the range of about 0.10 to about 0.30 may be prepared by the method. The device including the composition has a large voltage holding ratio. The composition is suitable for use in the AM device. The composition is particularly suitable for use in a transmissive AM device. The composition can be used as a composition having a nematic phase or as an optically active composition by adding an optically active compound.

The composition can be used for the AM device. The composition can also be used for a PM device. The composition can be used for an AM device and a PM device both having a mode such as PC, TN, STN, ECB, OCB, IPS, FFS, VA or FPA. Use for the AM device having the TN, OCB, IPS or FFS mode is particularly preferred. In the AM device having the IPS or FFS mode, alignment of liquid crystal molecules when no voltage is applied may be parallel or vertical to a glass substrate. The devices may be of a reflective type, a transmissive type or a transflective type.

Use for the transmissive device is preferred. The composition can also be used for an amorphous silicon-TFT device or for a polysilicon-TFT device. The composition can also be used for a nematic curvilinear aligned phase (NCAP) device prepared by microencapsulating the composition, or a polymer dispersed (PD) device in which a 3D network-polymer is formed in the composition.

EXAMPLES

The invention will be described in more detail by way of Examples. The invention is not restricted by the Examples. For example, the invention includes a mixture of the composition in Example 1 and the composition in Example 2. The invention also includes a mixture in which at least two compositions in Examples were mixed. A compound synthesized was identified by a method such as an NMR analysis. Characteristics of the compound, the composition and a device were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, measurement was carried out under conditions of 24 times of accumulation using $CFCl_3$ as an internal standard. In the explanation of a nuclear magnetic resonance spectrum, s, d, t, q, quin, sex and m stand for a singlet, a doublet, a triplet, a quartet, a quintet, a sextet and a multiplet, respectively, and br means being broad.

Gas chromatographic analysis: GC-14B Gas Chromatograph made by Shimadzu Corporation was used for measurement. The carrier gas was helium (2 mL/min). The sample injector and the detector (FID) were set to 280° C. and 300° C., respectively. A capillary column DB-1 (length: 30 m, bore: 0.32 mm, film thickness: 0.25 μm; dimethylpolysiloxane as a stationary phase, non-polar) made by Agilent Technologies, Inc. was used to separate component compounds. After a column was kept at 200° C. for 2 min, the column was heated to 280° C. at a rate of 5° C./min. A sample was prepared in an acetone solution (0.1 wt %), and then 1 μL of the solution was injected into the sample injector. The recorder was C-R5A Chromatopac made by Shimadzu Corporation or an equivalent thereof. The resulting gas chromatogram showed a peak retention time and a peak area corresponding to each of the component compounds.

As a solvent for diluting the sample, chloroform, hexane or the like may also be used. The following capillary columns may also be used for separating the component compounds: HP-1 (length: 30 m, bore: 0.32 mm, film thickness: 0.25 μm) made by Agilent Technologies, Inc., Rtx-1 (length: 30 m, bore: 0.32 mm, film thickness: 0.25 μm) made by Restek Corporation and BP-1 (length: 30 m, bore: 0.32 mm, film thickness: 0.25 μm) made by SGE International Pty. Ltd. A capillary column CBP1-M50-025 (length: 50 m, bore: 0.25 mm, film thickness: 0.25 μm) made by Shimadzu Corporation may also be used for avoiding an overlap of peaks of the compounds.

The proportions of the liquid crystal compounds contained in the composition may be calculated by the method described below. A mixture of the liquid crystal compounds was detected by gas chromatograph (FID). The ratio of the peak areas in the gas chromatogram corresponds to the ratio (weight ratio) of the liquid crystal compounds. When the capillary column described above was used, a correction coefficient of each of the liquid crystal compounds may be regarded as 1 (one). Accordingly, the proportions (wt %) of the liquid crystal compounds can be calculated from the ratio of the peak areas.

Sample for measurement: When characteristics of a composition or a device were measured, the composition was used as was. When characteristics of a compound were measured, a sample for measurement was prepared by mixing the compound (15 wt %) with a base liquid crystal (85 wt %). The values of the characteristics of the compound were calculated using values obtained by measurement through extrapolation: (extrapolated value)={(measured value of a sample for measurement)−0.85×(measured value of a base liquid crystal)}/0.15. When a smectic phase (or crystals) precipitated at the ratio thereof at 25° C., the ratio of the compound to the base liquid crystal was changed step by step in the order of (10 wt %: 90 wt %), (5 wt %: 95 wt %) and (1 wt %: 99 wt %). The values of maximum temperature, optical anisotropy, viscosity and dielectric anisotropy with regard to the compound were determined using the extrapolation method.

The base liquid crystal described below was used. The proportion of each component compound was expressed in terms of weight percent (wt %).

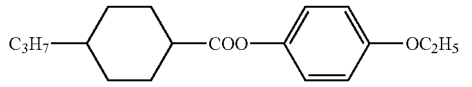

17.2%

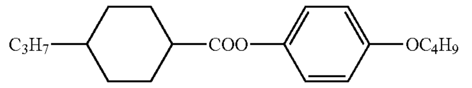

27.6%

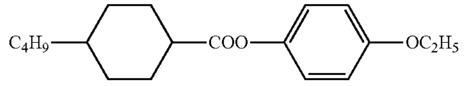

20.7%

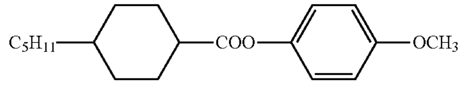

20.7%

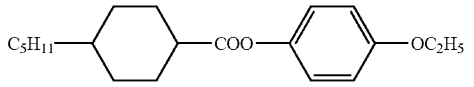

13.8%

Measuring method: Characteristics were measured by methods described below, most of which are applied as described in the JEITA ED-2521B Standard discussed and established by Japan Electronics and Information Technology Industries Association (JEITA), or as modified thereon. No thin film transistor (TFT) was attached to the TN device used for measurement.

(1) Maximum temperature of nematic phase (NI; ° C.): A sample was placed on a hot plate in a melting point apparatus equipped with a polarizing microscope and was heated at a rate of 1° C./min. The temperature at which a part of the sample began to change from a nematic phase to an isotropic liquid was measured. The higher limit of the temperature range of the nematic phase may be occasionally abbreviated as "maximum temperature."

(2) Minimum temperature of nematic phase ($T_c$; ° C.): Samples each having a nematic phase were put in glass vials and kept in freezers at 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c$<−20° C. The lower limit of the temperature range of the nematic phase may be occasionally abbreviated as "minimum temperature."

(3) Viscosity (bulk viscosity; η; measured at 20° C.; mPa·s): A cone-plate (E type) rotational viscometer made by TOKYO KEIKI INC. was used for the measurement.

(4) Viscosity (rotational viscosity; γ1; measured at 25° C.; mPa·s): Measurement was carried out according to the method described in M. Imai et al., *Molecular Crystals and Liquid Crystals*, Vol. 259, p. 37 (1995). A sample was put in a VA device in which a distance (cell gap) between two glass substrates was 20 μm. Voltage was applied stepwise to the device in the range of 39 V to 50 V at an increment of 1 V. After 0.2 sec with no voltage application, voltage was applied repeatedly under conditions of only one rectangular wave (rectangular pulse; 0.2 sec) and no application (2 sec). A peak current and a peak time of a transient current generated by the applied voltage were measured. The value of rotational viscosity was obtained from the measured values according to Equation (8) on page 40 of the paper of M. Imai et al. Dielectric anisotropy required for the calculation was measured by the method described in section (6).

(5) Optical anisotropy (refractive index anisotropy; Δn; measured at 25° C.): Measurement was carried out with an Abbe refractometer having a polarizing plate mounted on an ocular, using light at the wavelength of 589 nm. A surface of amain prism was rubbed in one direction, and then a sample was added dropwise onto the main prism. The refractive index $n_{//}$ was measured when the direction of polarized light was parallel to the direction of rubbing, and $n_\perp$ measured when the direction of polarized light was perpendicular to the direction of rubbing. The value of optical anisotropy was calculated from the equation "$\Delta n = n_{//} - n_\perp$".

(6) Dielectric anisotropy (Δ∈; measured at 25° C.): The value of Δ∈ was calculated from the equation: "$\Delta\in = \in_{//} - \in_\perp$". The dielectric constants $\in_{//}$ and $\in_\perp$ were measured as described below.

(1) Measurement of $\in_{//}$: An ethanol (20 mL) solution of octadecyltriethoxysilane (0.16 mL) was applied to a well-cleaned glass substrate. After rotating the glass substrate with a spinner, the glass substrate was heated at 150° C. for 1 hour. A sample was put in a VA device in which the distance (cell gap) between two glass substrates was 4 μm, and the device was sealed with a UV-curable adhesive. Sine waves (0.5V, 1 kHz) were applied to the device, and after 2 sec, the dielectric constant $\in_{//}$ in the major axis direction of liquid crystal molecules was measured.

(2) Measurement of $\in_\perp$: A polyimide solution was applied to a well-cleaned glass substrate. After calcining the glass substrate, rubbing treatment was applied to the alignment film obtained. A sample was put in a TN device in which the distance (cell gap) between two glass substrates was 9 μm and a twist angle was 80°. Sine waves (0.5 V, 1 kHz) were applied to the device, and after 2 sec, the dielectric constant $\in_\perp$ in the minor axis direction of the liquid crystal molecules was measured.

(7) Threshold voltage (Vth; measured at 25° C.; V): An LCD-5100 luminance meter made by Otsuka Electronics Co., Ltd. was used for measurement. The light source was a halogen lamp. A sample was put in a normally black mode VA device in which the distance (cell gap) between two glass substrates was 4 μm and a rubbing direction was anti-parallel, and the device was sealed with a UV-curable adhesive. A voltage (60 Hz, rectangular waves) to be applied to the device was stepwise increased from 0 V to 20 V at an increment of 0.02 V. On the occasion, the device was irradiated with light from a direction perpendicular to the device, and the amount of light transmitted through the device was measured. A voltage-transmittance curve was prepared, in which a maximum amount of light corresponds to 100% transmittance and a minimum amount of light corresponds to 0% transmittance. The voltage at 10% transmittance was taken as the threshold voltage.

(8) Voltage holding ratio (VHR-1; measured at 25° C.; %):A TN device used for measurement had a polyimide alignment film and the distance (cell gap) between two glass substrates was 5 μm. A sample was put in the device, and then the device was sealed with a UV-curable adhesive. A pulse voltage (60 μs at 5 V) was applied to the TN device to charge the device. The decaying voltage was measured for 16.7 milliseconds with a high-speed voltmeter, and the area A between a voltage curve and a horizontal axis in a unit cycle was determined. Area B was an area without decay. The voltage holding ratio is expressed in terms of a percentage of area A to area B.

(9) Voltage holding ratio (VHR-2; measured at 80° C.; %):A voltage holding ratio was measured in procedures identical with the procedures described above except that the voltage holding ratio was measured at 80° C. in place of 25° C. The values obtained were expressed by VHR-2.

(10) Voltage holding ratio (VHR-3; measured at 25° C.; %):Stability to UV light was evaluated by measuring a voltage holding ratio after a device was irradiated with UV light. A TN device used for measurement had a polyimide alignment film, and the cell gap was 5 μm. A sample was injected into the device, and then the device was irradiated with light for 20 min. A light source was an ultra high-pressure mercury lamp USH-500D (made by Ushio, Inc.), and the distance between the device and the light source was 20 cm. In measuring VHR-3, a decaying voltage was measured for 16.7 milliseconds. A composition having a large VHR-3 has a large stability to UV light. The value of VHR-3 is preferably 90% or more, and further preferably, 95% or more.

(11) Voltage holding ratio (VHR-4; measured at 25° C.; %):A TN device into which a sample was injected was heated in a constant-temperature bath at 80° C. for 500 hours, and then the stability to heat was evaluated by measuring a voltage holding ratio. In measuring VHR-4, the decaying voltage was measured for 16.7 milliseconds. A composition having a large VHR-4 has a large stability to heat.

(12) Response time (τ; measured at 25° C.; ms): An LCD-5100 luminance meter made by Otsuka Electronics Co., Ltd. was used for the measurement. The light source was a halogen lamp. A low-pass filter was set at 5 kHz. A sample was put in a normally black mode VA device in which the distance (cell gap) between two glass substrates was 4 μm and a rubbing direction was anti-parallel. Then, the device was sealed using a UV-curable adhesive. Rectangular waves (60 Hz, 10 V, 0.5 sec) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. The response time was expressed in terms of time required for a change from 90% transmittance to 10% transmittance (fall time; millisecond).

(13) Specific resistance (ρ; measured at 25° C.; Ωcm):Into a vessel equipped with electrodes, 1.0 mL of sample was injected. A DC voltage (10 V) was applied to the vessel, and a DC current after 10 seconds was measured. The specific resistance was calculated from the equation "(specific resistance)={(voltage)×(electric capacity of a vessel)}/{(direct current)×(dielectric constant of vacuum)}".

The compounds in Examples were described using symbols according to definitions in Table 3 below. In Table 3, the configuration of 1,4-cyclohexylene is trans. The parenthesized number next to a symbolized compound is the number of the compound. The symbol "(-)" means any other liquid crystal compound. The proportion of a liquid crystal compound is expressed in terms of weight percent (wt %) based on the weight of the liquid crystal composition. The values of the characteristics of the composition were summarized in the last part.

TABLE 3

Method for Description of Compounds using Symbols

| $R—(A_1)—Z_1— \ldots —Z_n—(A_n)—R'$ | Symbol |
|---|---|
| 1) Left-terminal Group R— | |
| $FC_nH_{2n}—$ | Fn- |
| $C_nH_{2n+1}—$ | n- |
| $C_nH_{2n+1}O—$ | nO- |
| $C_mH_{2m+1}OC_nH_{2n}—$ | mOn- |
| $CH_2{=}CH—$ | V- |
| $C_nH_{2n+1}—CH{=}CH—$ | nV- |
| $CH_2{=}CH—C_nH_{2n}—$ | Vn- |
| $C_mH_{2m+1}—CH{=}CH—C_nH_{2n}—$ | mVn- |
| $CF_2{=}CH—$ | VFF- |
| $CF_2{=}CH—C_nH_{2n}—$ | VFFn- |
| $C_mH_{2m+1}CF_2C_nH_{2n}—$ | m(CF2)n- |
| $CH_2{=}CHCOO—$ | AC- |
| $CH_2{=}C(CH_3)COO—$ | MAC- |
| 2) Right-terminal Group —F | |
| $—C_nH_{2n+1}$ | -n |
| $—OC_nH_{2n+1}$ | -On |
| $—CH{=}CH_2$ | -V |
| $—CH{=}CH—C_nH_{2n+1}$ | -Vn |
| $—C_nH_{2n}—CH{=}CH_2$ | -nV |
| $—C_mH_{2m}—CH{=}CH—C_nH_{2n+1}$ | -mVn |
| $—CH{=}CF_2$ | -VFF |
| $—OCOCH{=}CH_2$ | -AC |
| $—OCOC(CH_3){=}CH_2$ | -MAC |
| 3) Bonding Group —Zn— | |
| $—C_nH_{2n}—$ | n |
| $—COO—$ | E |
| $—CH{=}CH—$ | V |
| $—CH{=}CHO—$ | VO |
| $—OCH{=}CH—$ | OV |
| $—CH_2O—$ | 1O |
| $—OCH_2—$ | O1 |
| 4) Ring Structure —An— | |
| 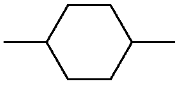 | H |
| 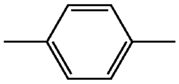 | B |

TABLE 3-continued

Method for Description of Compounds using Symbols

| $R—(A_1)—Z_1— \ldots —Z_n—(A_n)—R'$ | Symbol |
|---|---|
| 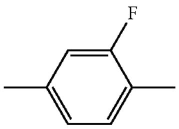 | B(F) |
| 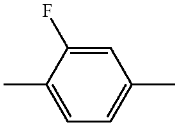 | B(2F) |
| 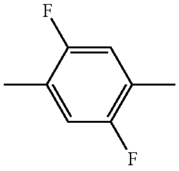 | B(2F,5F) |
| 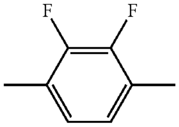 | B(2F,3F) |
| 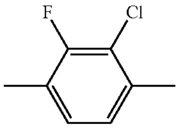 | B(2F,3Cl) |
| 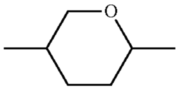 | dh |
| 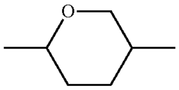 | Dh |
| 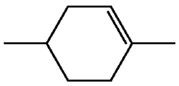 | ch |
| 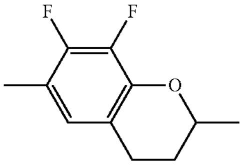 | Cro(7F,8F) |
| 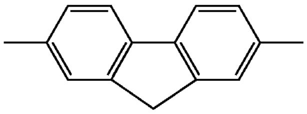 | FL |

TABLE 3-continued

| Method for Description of Compounds using Symbols | |
|---|---|
| $R-(A_1)-Z_1- \ldots -Z_n-(A_n)-R'$ | Symbol |
| 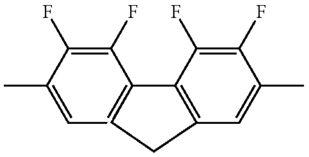 | FLF4 |

5) Examples of Description

Example 1. 3-HFLF4-3

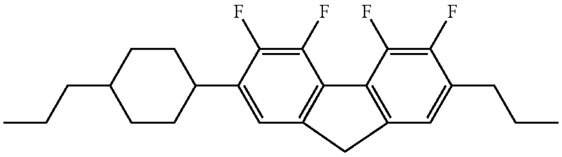

Example 2. 5-BB(2F,3F)-O2

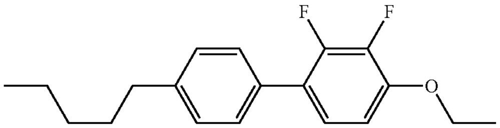 [SMILES: CCCCCc1ccc(-c2ccc(OCC)c(F)c2F)cc1]

Example 3. 3-HBB-1

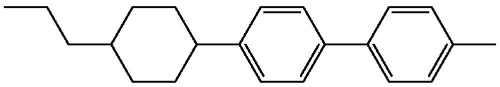 [SMILES: CCCC1CCC(c2ccc(-c3ccc(C)cc3)cc2)CC1]

Example 4. AC-BB-AC

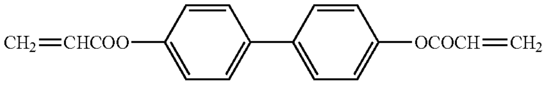

Example 1

| | | |
|---|---|---|
| 5-HFLF4-2V | (1-1) | 1% |
| 5-chFLF4-3 | (1-2) | 1% |
| 3-DhFLF4-5 | (1-3) | 1% |
| 5-DhFLF4-5 | (1-3) | 1% |
| 5-H2FLF4-3 | (1-6) | 1% |
| 3-HH-V | (2-1) | 25% |
| 1-HH-2V1 | (2-1) | 3% |
| 3-HH-2V1 | (2-1) | 3% |
| 1V2-BB-1 | (2-3) | 4% |
| 3-HHB-O1 | (2-5) | 4% |
| 3-BB(F)B-2V | (2-7) | 3% |
| 5-B(F)BB-3 | (2-8) | 3% |
| V-HB(2F,3F)-O2 | (3-1) | 3% |
| 3-H2B(2F,3F)-O2 | (3-2) | 5% |
| 2O-BB(2F,3F)-O2 | (3-4) | 6% |
| 2-HHB(2F,3F)-O2 | (3-6) | 3% |
| 3-HHB(2F,3F)-O2 | (3-6) | 3% |
| V-HHB(2F,3F)-O2 | (3-6) | 5% |
| V-HHB(2F,3F)-O4 | (3-6) | 3% |
| 2-HH1OB(2F,3F)-O2 | (3-8) | 3% |
| 3-HH1OB(2F,3F)-O2 | (3-8) | 4% |
| V-HH1OB(2F,3F)-O2 | (3-8) | 4% |
| 2-BB(2F,3F)B-3 | (3-9) | 4% |
| 2-BB(2F,3F)B-4 | (3-9) | 4% |
| 3-HBB(2F,3Cl)-O2 | (3-13) | 3% |

NI = 84.0° C.;
$\eta$ = 22.1 mPa · s;
$\Delta n$ = 0.117;
$\Delta\epsilon$ = −2.6;
Vth = 2.41 V;
$\gamma 1$ = 64.9 mPa · s.

Comparative Example 1

The composition in Example 1 contains compound (1) being a first component. Compound (1) has a negative dielectric anisotropy. For comparison, a composition in which five compounds being a first component in Example 1 were replaced by similar compounds was taken as Comparative Example 1.

| | | |
|---|---|---|
| 3-FL2B(2F,3F)-O2 | (—) | 1% |
| 4-FL2B(2F,3F)-O2 | (—) | 2% |
| 5-FL2B(2F,3F)-O2 | (—) | 2% |
| 3-HH-V | (2-1) | 25% |
| 1-HH-2V1 | (2-1) | 3% |
| 3-HH-2V1 | (2-1) | 3% |
| 1V2-BB-1 | (2-3) | 4% |
| 3-HHB-O1 | (2-5) | 4% |
| 3-BB(F)B-2V | (2-7) | 3% |
| 5-B(F)BB-3 | (2-8) | 3% |
| V-HB(2F,3F)-O2 | (3-1) | 3% |
| 3-H2B(2F,3F)-O2 | (3-2) | 5% |
| 2O-BB(2F,3F)-O2 | (3-4) | 6% |
| 2-HHB(2F,3F)-O2 | (3-6) | 3% |
| 3-HHB(2F,3F)-O2 | (3-6) | 3% |
| V-HHB(2F,3F)-O2 | (3-6) | 5% |
| V-HHB(2F,3F)-O4 | (3-6) | 3% |
| 2-HH1OB(2F,3F)-O2 | (3-8) | 3% |
| 3-HH1OB(2F,3F)-O2 | (3-8) | 4% |
| V-HH1OB(2F,3F)-O2 | (3-8) | 4% |
| 2-BB(2F,3F)B-3 | (3-9) | 4% |
| 2-BB(2F,3F)B-4 | (3-9) | 4% |
| 3-HBB(2F,3Cl)-O2 | (3-13) | 3% |

NI = 84.8° C.;
$\eta$ = 20.6 mPa · s;
$\Delta n$ = 0.119;
$\Delta\epsilon$ = −2.3;
Vth = 2.47 V;
$\gamma 1$ = 60.8 mPa · s.

Example 2

| | | |
|---|---|---|
| 5-HFLF4-4 | (1-1) | 1% |
| 2-chFLF4-3 | (1-2) | 1% |
| 3-chFLF4-3 | (1-2) | 1% |
| 5-chFLF4-3 | (1-2) | 1% |
| 3-DhFLF4-5 | (1-3) | 1% |
| 5-DhFLF4-5 | (1-3) | 1% |
| 3-H2FLF4-3 | (1-6) | 1% |
| 5-H2FLF4-3 | (1-6) | 1% |
| 3-HH-V | (2-1) | 23% |
| 3-HH-V1 | (2-1) | 15% |
| 3-HHEH-3 | (2-4) | 3% |
| 1-BB(F)B-2V | (2-7) | 3% |
| 5-HBB(F)B-2 | (2-13) | 3% |
| 3-HB(2F,3F)-O2 | (3-1) | 10% |
| 3-BB(2F,3F)-O2 | (3-4) | 6% |
| 2-HHB(2F,3F)-O2 | (3-6) | 3% |
| 3-HHB(2F,3F)-O2 | (3-6) | 4% |

-continued

| | | |
|---|---|---|
| V-HHB(2F,3F)-O2 | (3-6) | 12% |
| 3-HH1OB(2F,3F)-O2 | (3-8) | 10% |

NI = 87.1° C.;
η = 22.0 mPa · s;
Δn = 0.098;
Δϵ = −3.1;
Vth = 2.34 V;
γ1 = 64.9 mPa · s.

Example 3

| | | |
|---|---|---|
| 5-HFLF4-3 | (1-1) | 1% |
| 3-chFLF4-3 | (1-2) | 1% |
| 5-chFLF4-3 | (1-2) | 1% |
| 2-H2FLF4-3 | (1-6) | 1% |
| 3-H2FLF4-3 | (1-6) | 1% |
| 4-H2FLF4-3 | (1-6) | 1% |
| 5-H2FLF4-3 | (1-6) | 1% |
| 3-HH-V | (2-1) | 28% |
| 3-HH-V1 | (2-1) | 9% |
| 3-HB-O2 | (2-2) | 4% |
| 3-HHB-O1 | (2-5) | 5% |
| 3-HB(F)HH-2 | (2-9) | 3% |
| 3-HB(2F,3F)-O2 | (3-1) | 7% |
| 3-BB(2F,3F)-O2 | (3-4) | 6% |
| 2-HHB(2F,3F)-O2 | (3-6) | 6% |
| 3-HHB(2F,3F)-O2 | (3-6) | 5% |
| V-HHB(2F,3F)-O2 | (3-6) | 5% |
| 3-HH1OB(2F,3F)-O2 | (3-8) | 8% |
| 2-BB(2F,3F)B-3 | (3-9) | 3% |
| 3-HH1OCro(7F,8F)-5 | (3-15) | 4% |

NI = 85.9° C.;
η = 20.8 mPa · s;
Δn = 0.093;
Δϵ = −2.9;
Vth = 2.38 V;
γ1 = 61.0 mPa · s.

Example 4

| | | |
|---|---|---|
| 5-HFLF4-3 | (1-1) | 1% |
| 5-HFLF4-4 | (1-1) | 1% |
| 2-DhFLF4-5 | (1-3) | 1% |
| 3-DhFLF4-5 | (1-3) | 1% |
| 3-HH-V | (2-1) | 25% |
| 3-HH-V1 | (2-1) | 6% |
| F3-HH-V | (2-1) | 3% |
| F3-HH-V1 | (2-1) | 3% |
| 1-BB-3 | (2-3) | 4% |
| VFF-HHB-1 | (2-5) | 3% |
| VFF2-HHB-1 | (2-5) | 3% |
| V-HB(2F,3F)-O2 | (3-1) | 4% |
| 3-H2B(2F,3F)-O2 | (3-2) | 3% |
| 3-H1OB(2F,3F)-O2 | (3-3) | 7% |
| 2-HHB(2F,3F)-O2 | (3-6) | 5% |
| V-HHB(2F,3F)-O1 | (3-6) | 3% |
| V-HHB(2F,3F)-O2 | (3-6) | 8% |
| 3-HH1OB(2F,3F)-O2 | (3-8) | 6% |
| V-HH1OB(2F,3F)-O2 | (3-8) | 6% |
| 2-BB(2F,3F)B-3 | (3-9) | 4% |
| 1O1-HBBH-5 | (—) | 3% |

NI = 79.1° C.;
η = 18.5 mPa · s;
Δn = 0.092;
Δϵ = −2.6;
Vth = 2.40 V;
γ1 = 54.1 mPa · s.

Example 5

| | | |
|---|---|---|
| 5-HFLF4-4 | (1-1) | 1% |
| 5-HFLF4-2V | (1-1) | 1% |
| 5-chFLF4-3 | (1-2) | 1% |
| 3-DhFLF4-5 | (1-3) | 1% |
| 3-H2FLF4-3 | (1-6) | 1% |
| 5-H2FLF4-3 | (1-6) | 1% |
| 5-HH-VFF | (2-1) | 5% |
| 3-HH-V | (2-1) | 18% |
| 4-HH-V | (2-1) | 7% |
| 4-HH-V1 | (2-1) | 8% |
| 1-BB-5 | (2-3) | 4% |
| 2-BB(F)B-5 | (2-7) | 3% |
| 2-BB(F)B-2V | (2-7) | 3% |
| 3-HB(2F,3F)-O2 | (3-1) | 12% |
| 3-BB(2F,3F)-O2 | (3-4) | 4% |
| 5-HH2B(2F,3F)-O2 | (3-7) | 3% |
| 2-HH1OB(2F,3F)-O2 | (3-8) | 9% |
| 2-BB(2F,3F)B-3 | (3-9) | 3% |
| 2-HBB(2F,3F)-O2 | (3-10) | 4% |
| 3-HBB(2F,3F)-O2 | (3-10) | 6% |
| V-HBB(2F,3F)-O2 | (3-10) | 5% |

NI = 71.8° C.;
η = 19.0 mPa · s;
Δn = 0.109;
Δϵ = −2.9;
Vth = 2.37 V;
γ1 = 55.6 mPa · s.

Example 6

| | | |
|---|---|---|
| 2-chFLF4-3 | (1-2) | 1% |
| 3-chFLF4-3 | (1-2) | 1% |
| 4-chFLF4-3 | (1-2) | 1% |
| 5-chFLF4-3 | (1-2) | 1% |
| 3-DhFLF4-5 | (1-3) | 1% |
| 5-DhFLF4-5 | (1-3) | 1% |
| 3-H2FLF4-3 | (1-6) | 1% |
| 5-H2FLF4-3 | (1-6) | 1% |
| 3-HH-V | (2-1) | 22% |
| 3-HH-V1 | (2-1) | 9% |
| 5-HH-V | (2-1) | 4% |
| 3-HHB-3 | (2-5) | 7% |
| V2-HHB-1 | (2-5) | 8% |
| 5-HB(F)BH-3 | (2-12) | 3% |
| 3-H1OB(2F,3F)-O2 | (3-3) | 9% |
| V-H1OB(2F,3F)-O2 | (3-3) | 7% |
| 3-HHB(2F,3F)-O2 | (3-6) | 6% |
| V-HHB(2F,3F)-O1 | (3-6) | 3% |
| V-HHB(2F,3F)-O2 | (3-6) | 5% |
| 3-HH1OB(2F,3F)-O2 | (3-8) | 6% |
| 3-HHB(2F,3Cl)-O2 | (3-12) | 3% |

NI = 88.0° C.;
η = 21.8 mPa · s;
Δn = 0.088;
Δϵ = −2.8;
Vth = 2.39 V;
γ1 = 64.0 mPa · s.

Example 7

| | | |
|---|---|---|
| 5-HFLF4-3 | (1-1) | 1% |
| 5-HFLF4-4 | (1-1) | 1% |
| 5-HFLF4-2V | (1-1) | 1% |
| 5-chFLF4-3 | (1-2) | 1% |
| 3-DhFLF4-5 | (1-3) | 1% |
| 4-DhFLF4-5 | (1-3) | 1% |
| 5-DhFLF4-5 | (1-3) | 1% |
| 2-H2FLF4-3 | (1-6) | 1% |

-continued

| | | |
|---|---|---|
| 3-H2FLF4-3 | (1-6) | 1% |
| 5-H2FLF4-3 | (1-6) | 1% |
| 3-HH-V | (2-1) | 40% |
| V-HHB-1 | (2-5) | 6% |
| V-HB(2F,3F)-O2 | (3-1) | 3% |
| 3-HB(2F,3F)-O2 | (3-1) | 3% |
| 3-BB(2F,3F)-O2 | (3-4) | 4% |
| 2-HHB(2F,3F)-O2 | (3-6) | 3% |
| 3-HHB(2F,3F)-O2 | (3-6) | 4% |
| V-HHB(2F,3F)-O1 | (3-6) | 3% |
| V-HHB(2F,3F)-O2 | (3-6) | 6% |
| V-HHB(2F,3F)-O4 | (3-6) | 3% |
| 3-HH1OB(2F,3F)-O2 | (3-8) | 5% |
| 3-HBB(2F,3F)-O2 | (3-10) | 5% |
| V-HBB(2F,3F)-O2 | (3-10) | 5% |

NI = 83.5° C.;
η = 21.4 mPa · s;
Δn = 0.094;
Δε = −3.4;
Vth = 2.31 V;
γ1 = 62.8 mPa · s.

Example 8

| | | |
|---|---|---|
| 5-HFLF4-3 | (1-1) | 1% |
| 5-HFLF4-4 | (1-1) | 1% |
| 2-chFLF4-3 | (1-2) | 1% |
| 3-chFLF4-3 | (1-2) | 1% |
| 4-chFLF4-3 | (1-2) | 1% |
| 5-chFLF4-3 | (1-2) | 1% |
| 2-DhFLF4-5 | (1-3) | 1% |
| 3-DhFLF4-5 | (1-3) | 1% |
| 5-DhFLF4-5 | (1-3) | 1% |
| 3-HH-V | (2-1) | 33% |
| 3-HH-V1 | (2-1) | 5% |
| 7-HB-1 | (2-2) | 4% |
| 3-HBB-2 | (2-6) | 5% |
| 3-HHEBH-4 | (2-10) | 3% |
| 3-HHEBH-5 | (2-10) | 3% |
| 5-H2B(2F,3F)-O2 | (3-2) | 5% |
| 3-H1OB(2F,3F)-O2 | (3-3) | 7% |
| V-HHB(2F,3F)-O1 | (3-6) | 3% |
| V2-HHB(2F,3F)-O2 | (3-6) | 5% |
| 3-HH2B(2F,3F)-O2 | (3-7) | 3% |
| 5-HH2B(2F,3F)-O2 | (3-7) | 5% |
| V-HH1OB(2F,3F)-O2 | (3-8) | 3% |
| 2-HBB(2F,3F)-O2 | (3-10) | 4% |
| 3-H1OCro(7F,8F)-5 | (3-14) | 3% |

NI = 86.0° C.;
η = 20.4 mPa · s;
Δn = 0.085;
Δε = −2.7;
Vth = 2.40 V;
γ1 = 59.8 mPa · s.

Example 9

| | | |
|---|---|---|
| 5-HFLF4-4 | (1-1) | 1% |
| 3-H2FLF4-3 | (1-6) | 1% |
| 5-H2FLF4-3 | (1-6) | 1% |
| 3-HH-VFF | (2-1) | 3% |
| 3-HH-V | (2-1) | 24% |
| 3-HH-V1 | (2-1) | 4% |
| 3-HHB-1 | (2-5) | 4% |
| V-HBB-2 | (2-6) | 4% |
| 5-B(F)BB-2 | (2-8) | 5% |
| 3-HHEBH-5 | (2-10) | 3% |
| 3-HB(2F,3F)-O2 | (3-1) | 5% |
| V-H1OB(2F,3F)-O2 | (3-3) | 11% |
| V2-BB(2F,3F)-O2 | (3-4) | 9% |

-continued

| | | |
|---|---|---|
| 2-HHB(2F,3F)-O2 | (3-6) | 5% |
| 3-HHB(2F,3F)-O2 | (3-6) | 4% |
| V-HHB(2F,3F)-O1 | (3-6) | 3% |
| V-HHB(2F,3F)-O2 | (3-6) | 10% |

NI = 78.1° C.;
η = 19.1 mPa · s;
Δn = 0.103;
Δε = −2.8;
Vth = 2.39 V;
γ1 = 55.9 mPa · s.

Example 10

| | | |
|---|---|---|
| 5-HFLF4-3 | (1-1) | 1% |
| 5-HFLF4-4 | (1-1) | 1% |
| 5-HFLF4-2V | (1-1) | 1% |
| 5-chFLF4-3 | (1-2) | 1% |
| 2-H2FLF4-3 | (1-6) | 1% |
| 3-H2FLF4-3 | (1-6) | 1% |
| 4-H2FLF4-3 | (1-6) | 1% |
| 5-H2FLF4-3 | (1-6) | 1% |
| 2-HH-3 | (2-1) | 5% |
| 3-HH-V | (2-1) | 35% |
| V2-BB-1 | (2-3) | 4% |
| V-HBB-3 | (2-6) | 4% |
| 2-BB(F)B-3 | (2-7) | 4% |
| 5-HBBH-3 | (2-11) | 4% |
| 3-H1OB(2F,3F)-O2 | (3-3) | 5% |
| 5-B(2F,3F)B(2F,3F)-O2 | (3-5) | 3% |
| V-HHB(2F,3F)-O2 | (3-6) | 5% |
| V-HHB(2F,3F)-O4 | (3-6) | 4% |
| 3-HH1OB(2F,3F)-O2 | (3-8) | 6% |
| V-HH1OB(2F,3F)-O2 | (3-8) | 7% |
| 3-HEB(2F,3F)B(2F,3F)-O2 | (3-11) | 3% |
| 5-HBB(2F,3Cl)-O2 | (3-13) | 3% |

NI = 82.8° C.;
η = 20.8 mPa · s;
Δn = 0.098;
Δε = −2.6;
Vth = 2.42 V;
γ1 = 61.0 mPa · s.

Example 11

| | | |
|---|---|---|
| 2-chFLF4-3 | (1-2) | 1% |
| 3-chFLF4-3 | (1-2) | 1% |
| 4-chFLF4-3 | (1-2) | 1% |
| 3-DhFLF4-5 | (1-3) | 1% |
| 5-DhFLF4-5 | (1-3) | 1% |
| 3-H2FLF4-3 | (1-6) | 1% |
| 5-H2FLF4-3 | (1-6) | 1% |
| 3-HH-4 | (2-1) | 4% |
| 3-HH-V | (2-1) | 32% |
| 4-HH-V | (2-1) | 7% |
| V-HHB-1 | (2-5) | 6% |
| 3-HB(2F,3F)-O2 | (3-1) | 7% |
| 3-BB(2F,3F)-O2 | (3-4) | 6% |
| 2-HHB(2F,3F)-O2 | (3-6) | 5% |
| V-HHB(2F,3F)-O2 | (3-6) | 10% |
| 3-HBB(2F,3F)-O2 | (3-10) | 8% |
| V-HBB(2F,3F)-O2 | (3-10) | 8% |

NI = 79.9° C.;
η = 17.6 mPa · s;
Δn = 0.095;
Δε = −3.0;
Vth = 2.36 V;
γ1 = 51.4 mPa · s.

Example 12

| | | |
|---|---|---|
| 5-HFLF4-3 | (1-1) | 1% |
| 5-HFLF4-4 | (1-1) | 1% |
| 3-chFLF4-3 | (1-2) | 1% |
| 4-chFLF4-3 | (1-2) | 1% |
| 5-chFLF4-3 | (1-2) | 1% |
| 2-H2FLF4-3 | (1-6) | 1% |
| 3-H2FLF4-3 | (1-6) | 1% |
| 5-H2FLF4-3 | (1-6) | 1% |
| 3-HH-V | (2-1) | 41% |
| V-HHB-1 | (2-5) | 5% |
| V-HB(2F,3F)-O2 | (3-1) | 3% |
| 3-BB(2F,3F)-O2 | (3-4) | 7% |
| 2-HHB(2F,3F)-O2 | (3-6) | 7% |
| 3-HHB(2F,3F)-O2 | (3-6) | 5% |
| V2-HHB(2F,3F)-O2 | (3-6) | 5% |
| 3-HBB(2F,3F)-O2 | (3-10) | 8% |
| 5-HBB(2F,3Cl)-O2 | (3-13) | 3% |
| 3-HDhB(2F,3F)-O2 | (3-16) | 5% |
| 3-dhBB(2F,3F)-O2 | (3-17) | 3% |

NI = 85.5° C.;
η = 20.5 mPa · s;
Δn = 0.098;
Δε = −3.3;
Vth = 2.30 V;
γ1 = 60.1 mPa · s.

Example 13

| | | |
|---|---|---|
| 5-HFLF4-2V | (1-1) | 1% |
| 2-chFLF4-3 | (1-2) | 1% |
| 3-chFLF4-3 | (1-2) | 1% |
| 5-chFLF4-3 | (1-2) | 1% |
| 3-DhFLF4-5 | (1-3) | 1% |
| 5-DhFLF4-5 | (1-3) | 1% |
| 3-HH-V | (2-1) | 31% |
| 3-HH-V1 | (2-1) | 8% |
| V-HHB-1 | (2-5) | 6% |
| V-HB(2F,3F)-O2 | (3-1) | 3% |
| 3-HB(2F,3F)-O2 | (3-1) | 3% |
| 3-BB(2F,3F)-O2 | (3-4) | 5% |
| V-HHB(2F,3F)-O1 | (3-6) | 4% |
| V-HHB(2F,3F)-O2 | (3-6) | 9% |
| V-HHB(2F,3F)-O4 | (3-6) | 3% |
| 2-HBB(2F,3F)-O2 | (3-10) | 5% |
| 3-HBB(2F,3F)-O2 | (3-10) | 7% |
| V-HBB(2F,3F)-O2 | (3-10) | 4% |
| V-chB(2F,3F)-O2 | (3-18) | 3% |
| 3-HchB(2F,3F)-O2 | (3-19) | 3% |

NI = 82.9° C.;
η = 19.0 mPa · s;
Δn = 0.100;
Δε = −3.0;
Vth = 2.38 V;
γ1 = 55.6 mPa · s.

The dielectric anisotropy (Δ∈) of the compositions in Comparative Example 1 was −2.3. Meanwhile, the dielectric anisotropy of the composition in Example 1 was −2.6. Thus, the compositions in Examples had a larger negative dielectric anisotropy in comparison with the values in Comparative Example. Accordingly, the liquid crystal composition according to the invention is concluded to have further excellent characteristics.

INDUSTRIAL APPLICABILITY

The liquid crystal composition of the invention satisfies at least one of characteristics such as a high maximum temperature, a low minimum temperature, a small viscosity, a suitable optical anisotropy, a large negative dielectric anisotropy, a large specific resistance, a high stability to UV light and a high stability to heat, or has a suitable balance regarding at least two of the characteristics. A liquid crystal display device including such a composition has characteristics such as a short response time, a large voltage holding ratio, a low threshold voltage, a large contrast ratio and a long service life, and thus can be used for a liquid crystal projector, a liquid crystal television and so forth.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The invention claimed is:

1. A liquid crystal composition that has a negative dielectric anisotropy, and contains at least one compound selected from the group consisting of compounds represented by formula (1) as a first component:

(1)

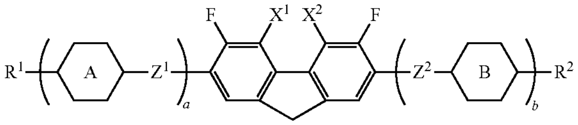

wherein in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring A and ring B are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine; $Z^1$ and $Z^2$ are independently a single bond, ethylene or carbonyloxy; $X^1$ and $X^2$ are independently hydrogen or fluorine; a is 0, 1, 2 or 3; b is 0 or 1; and a sum of a and b is 3 or less.

2. The liquid crystal composition of claim 1, containing at least one compound selected from the group consisting of compounds represented by formulae (1-1) to (1-9) as the first component:

(1-1)

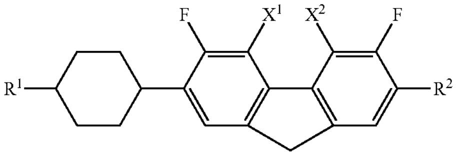

(1-2)

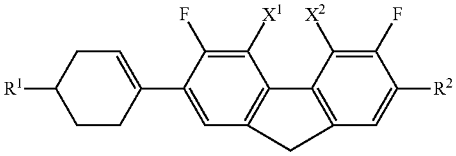

-continued (1-3)

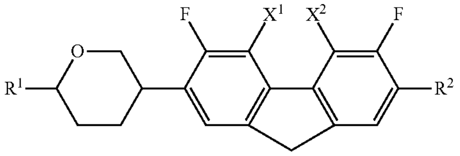

(1-4)

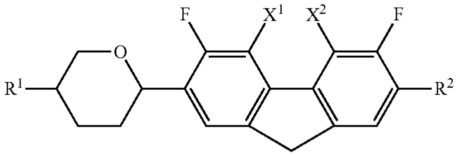

(1-5)

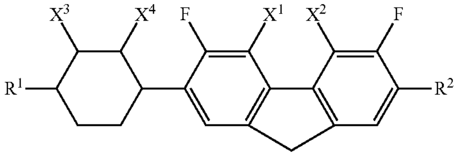

(1-6)

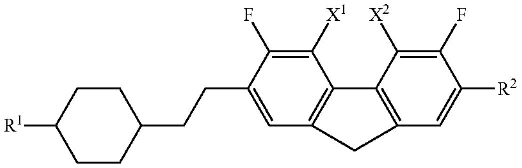

(1-7)

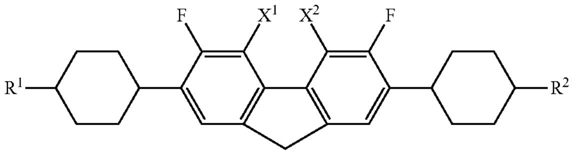

(1-8)

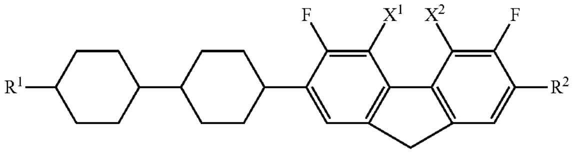

(1-9)

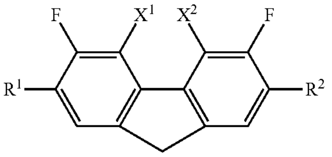

wherein in formulae (1-1) to (1-9), $R^1$ and $R^2$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; $X^1$, $X^2$, $X^3$ and $X^4$ are independently hydrogen or fluorine.

3. The liquid crystal composition of claim 1, wherein a proportion of the first component is in a range of 3 wt % to 25 wt % based on a weight of the liquid crystal composition.

4. The liquid crystal composition of claim 1, further containing at least one compound selected from the group consisting of compounds represented by formula (2) as a second component:

(2)

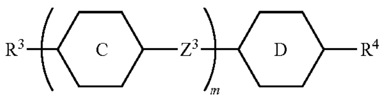

wherein in formula (2), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine;

ring C and ring D are independently 1,4-cyclohexylene, 1,4-phenylene, 2-fluoro-1,4-phenylene or 2,5-difluoro-1,4-phenylene; $Z^3$ is a single bond, ethylene or carbonyloxy; m is 1, 2 or 3.

5. The liquid crystal composition of claim 4, containing at least one compound selected from the group consisting of compounds represented by formulae (2-1) to (2-13) as the second component:

(2-1)

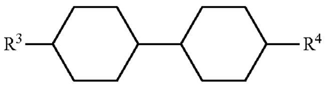

(2-2)

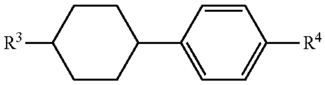

(2-3)

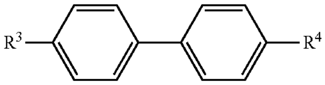

(2-4)

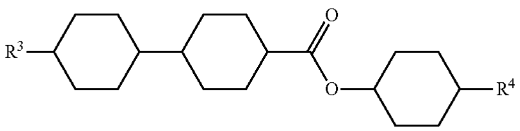

(2-5)

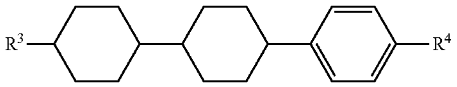

(2-6)

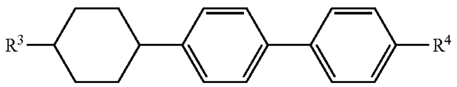

(2-7)

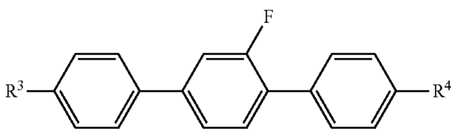

(2-8)

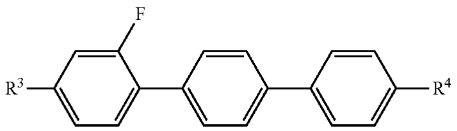

-continued (2-9)

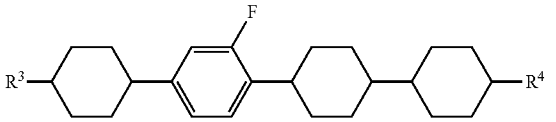

(2-10)

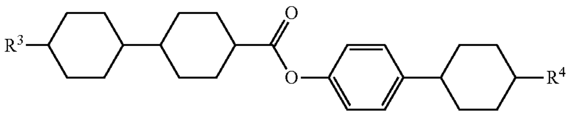

(2-11)

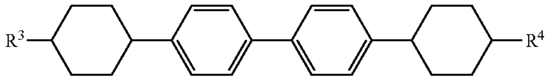

(2-12)

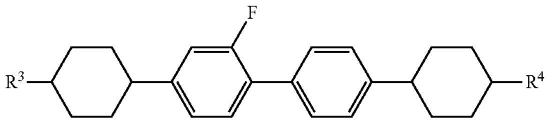

(2-13)

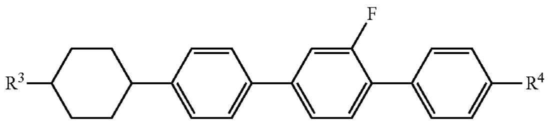

wherein in formulae (2-1) to (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen is replaced by fluorine or chlorine, or alkenyl having 2 to 12 carbons in which at least one hydrogen is replaced by fluorine or chlorine.

6. The liquid crystal composition of claim 4, wherein a proportion of the second component is in a range of 20 wt % to 90 wt % based on a weight of the liquid crystal composition.

7. The liquid crystal composition of claim 4, further containing at least one compound selected from the group consisting of compounds represented by formula (3) as a third component:

(3)

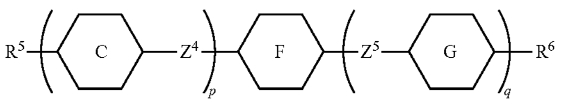

wherein in formula (3), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine; ring E and ring G are independently 1,4-cyclohexylene, 1,4-cyclohexenylene, tetrahydropyran-2,5-diyl, 1,4-phenylene, or 1,4-phenylene in which at least one hydrogen is replaced by fluorine or chlorine; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^4$ and $Z^5$ are independently a single bond, ethylene, carbonyloxy or methyleneoxy; p is 1, 2 or 3; q is 0 or 1; and a sum of p and q is 3 or less.

8. The liquid crystal composition of claim 7, containing at least one compound selected from the group consisting of compounds represented by formulae (3-1) to (3-19) as the third component:

(3-1)

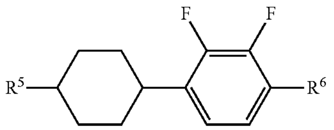

(3-2)

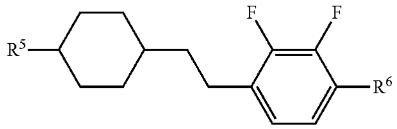

(3-3)

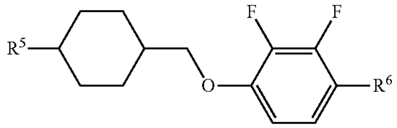

(3-4)

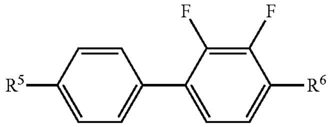

(3-5)

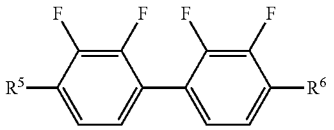

(3-6)

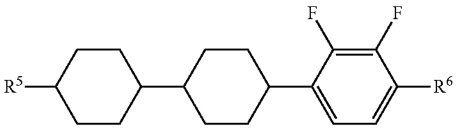

(3-7)

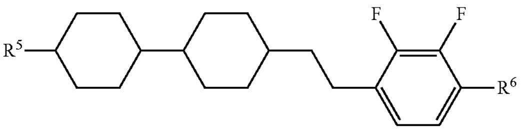

(3-8)

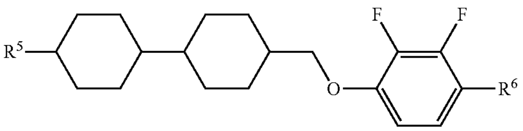

(3-9)

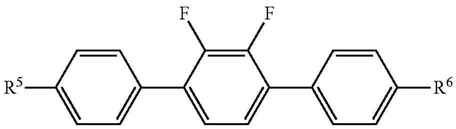

(3-10)

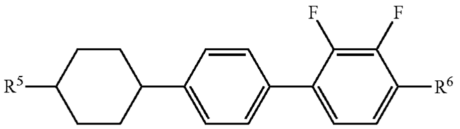

-continued (3-11)

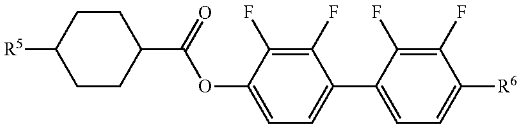

(3-12)

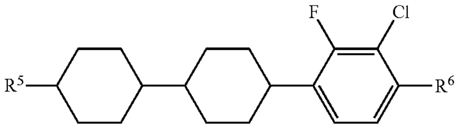

(3-13)

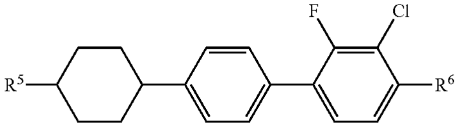

(3-14)

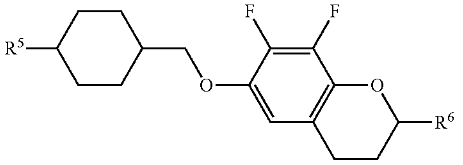

(3-15)

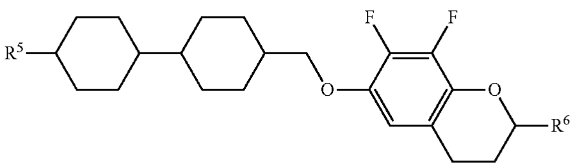

(3-16)

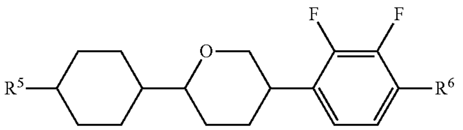

(3-17)

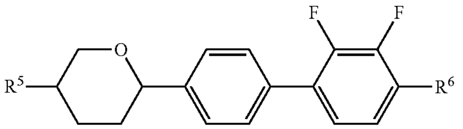

(3-18)

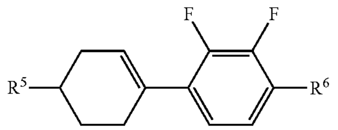

(3-19)

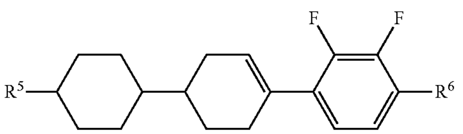

wherein in formula (3-1) to formula (3-19), $R^5$ and $R^6$ are independently alkyl having 1 to 12 carbons, alkoxy having 1 to 12 carbons, alkenyl having 2 to 12 carbons, alkenyloxy having 2 to 12 carbons, or alkyl having 1 to 12 carbons in which at least one hydrogen is replaced by fluorine or chlorine.

9. The liquid crystal composition of claim 7, wherein a proportion of the third component is in a range of 10 wt % to 80 wt % based on a weight of the liquid crystal composition.

10. The liquid crystal composition of claim 4, further containing at least one polymerizable compound selected from the group consisting of compounds represented by formula (4) as an additive component:

(4)

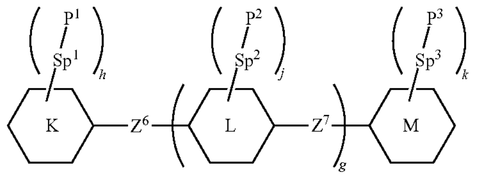

wherein in formula (4), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl, or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine;

ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^7$ are independently a single bond or alkylene having 1 to 10 carbons, and in the alkylene, at least one $—CH_2—$ may be replaced by $—O—$, $—CO—$, $—COO—$ or $—OCO—$, at least one $—CH_2—CH_2—$ may be replaced by $—CH{=}CH—$, $—C(CH_3){=}CH—$, $—CH{=}C(CH_3)—$ or $—C(CH_3){=}C(CH_3)—$, and in the alkylene and the groups obtained through the replacement, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one $—CH_2—$ may be replaced by $—O—$, $—COO—$, $—OCO—$ or $—OCOO—$, at least one $—CH_2—CH_2—$ may be replaced by $—CH{=}CH—$ or $—C{\equiv}C—$, and in the alkylene and the groups obtained through the replacement, at least one hydrogen may be replaced by fluorine or chlorine; g is 0, 1 or 2; h, j and k are independently 0, 1, 2, 3 or 4;

and a sum of h, j and k is 1 or more.

11. The liquid crystal composition of claim 10, wherein in formula (4), $P^1$, $P^2$ and $P^3$ are independently a polymerizable group selected from the group consisting of groups represented by formulae (P-1) to (P-5):

(P-1)

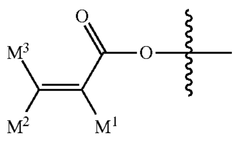

-continued (P-2)

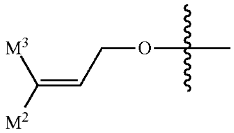

(P-3)

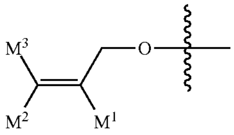

(P-4)

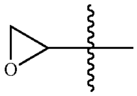

(P-5)

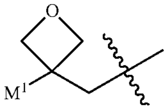

wherein in formulae (P-1) to (P-5), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine.

12. The liquid crystal composition of claim 11, containing at least one polymerizable compound selected from the group consisting of compounds represented by formulae (4-1) to (4-27) as the additive component:

(4-1)

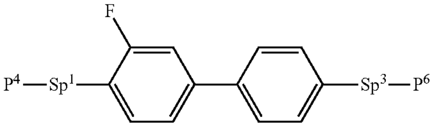

(4-2)

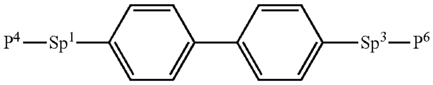

(4-3)

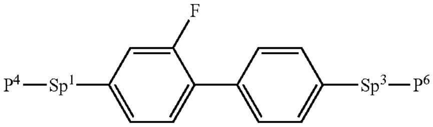

(4-4)

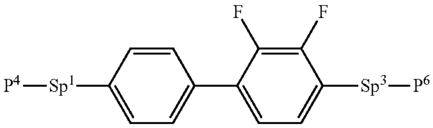

(4-5)

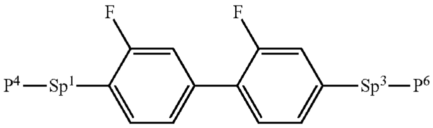

(4-6)

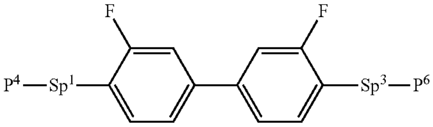

-continued (4-7)

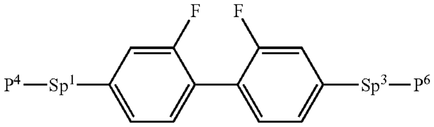

(4-8)

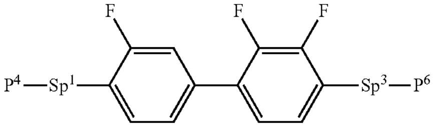

(4-9)

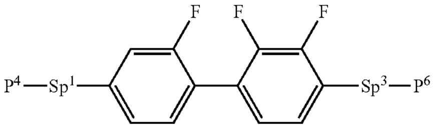

(4-10)

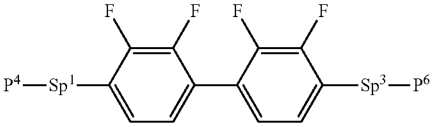

(4-11)

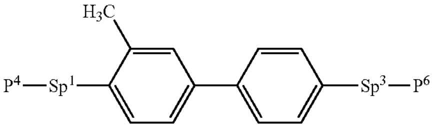

(4-12)

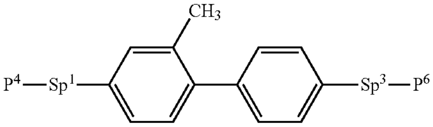

(4-13)

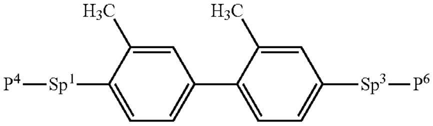

(4-14)

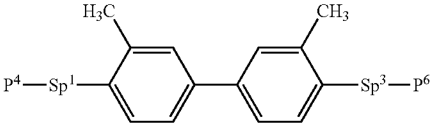

(4-15)

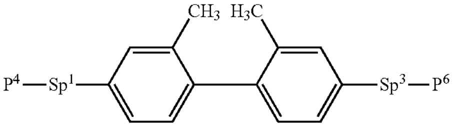

(4-16)

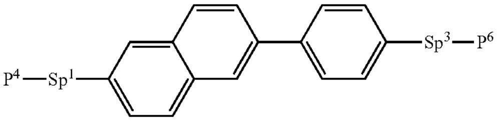

(4-17)

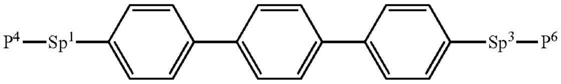

-continued (4-18)

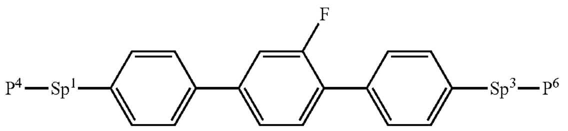

(4-19)

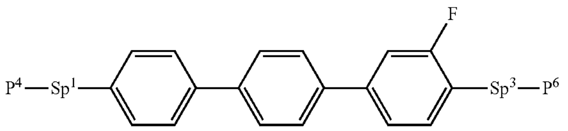

(4-20)

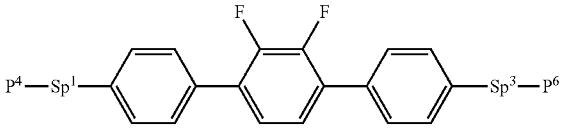

(4-21)

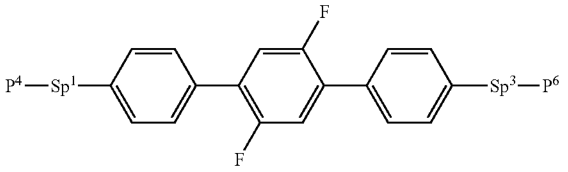

(4-22)

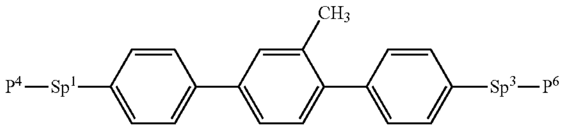

(4-23)

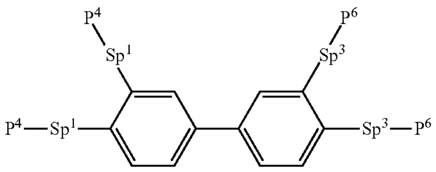

(4-24)

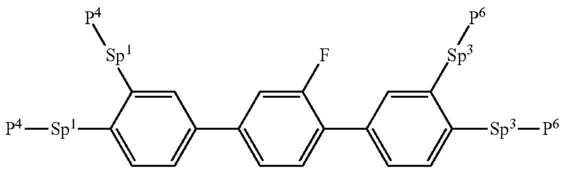

(4-25)

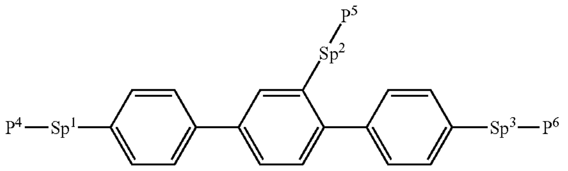

-continued (4-26)

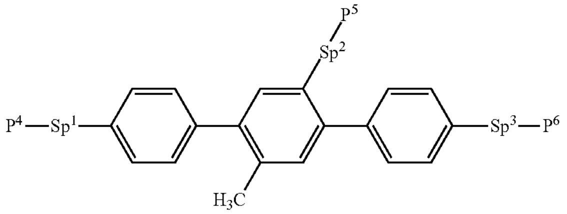

(4-27)

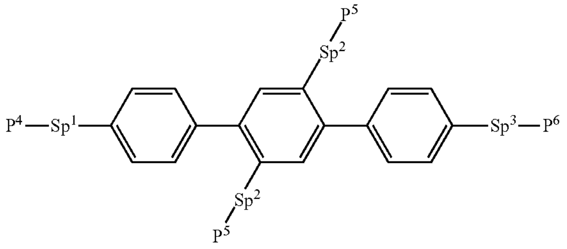

wherein in formulae (4-1) to (4-27), $P^4$, $P^5$ and $P^6$ are independently a polymerizable group selected from the group consisting of groups represented by formulae (P-1) to (P-3);

(P-1)

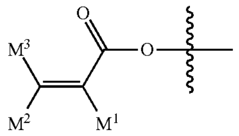

(P-2)

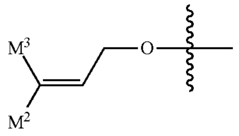

(P-3)

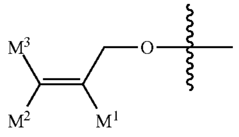

wherein in formulae (P-1) to (P-3), $M^1$, $M^2$ and $M^3$ are independently hydrogen, fluorine, alkyl having 1 to 5 carbons, or alkyl having 1 to 5 carbons in which at least one hydrogen is replaced by fluorine or chlorine;

and in formulae (4-1) to (4-27), $Sp^1$, $Sp^2$ and $Sp^3$ are independently a single bond or alkylene having 1 to 10 carbons, and in the alkylene, at least one $—CH_2—$ may be replaced by —O—, —COO—, —OCO— or —OCOO—, at least one $—CH_2—CH_2—$ may be replaced by —CH=CH—or —C≡C—, and in the alkylene and the groups obtained through the replacement, at least one hydrogen may be replaced by fluorine or chlorine.

13. The liquid crystal composition of claim 10, wherein a proportion of addition of the additive component is in a range of 0.03 wt % to 10 wt % based on a weight of the liquid crystal composition.

14. The liquid crystal composition of claim 7, further containing at least one polymerizable compound selected from the group consisting of compounds represented by foimula (4) as an additive component:

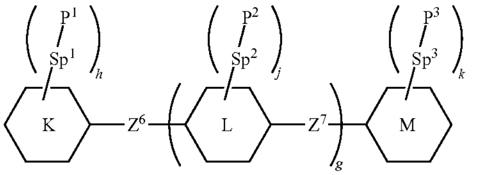

(4)

wherein in formula (4), ring K and ring M are independently cyclohexyl, cyclohexenyl, phenyl, 1-naphthyl, 2-naphthyl, tetrahydropyran-2-yl, 1,3-dioxane-2-yl, pyrimidine-2-yl, or pyridine-2-yl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine;

ring L is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in the rings, at least one hydrogen may be replaced by fluorine, chlorine, alkyl having 1 to 12 carbons, alkoxy having 1 to 12 carbons, or alkyl having 1 to 12 carbons in which at least one hydrogen is replaced by fluorine or chlorine; $Z^6$ and $Z^7$ are independently a single bond or alkylene having 1 to 10 carbons, and in the alkylene, at least one $—CH_2—$ may be replaced by —O—, —CO—, —COO— or —OCO—, at least one $—CH_2—CH_2—$may be replaced by —CH═CH—, $—C(CH_3)═CH—$, $—CH═C(CH_3)—$or $—C(CH_3)═C(CH_3)—$, and in the alkylene and the groups obtained through the replacement, at least one hydrogen may be replaced by fluorine or chlorine; $P^1$, $P^2$ and $P^3$ are independently a polymerizable group; $Sp^1$, $Sp^2$ and $Sp^3$ are independently a single bond or alkylene having 1 to 10 carbons, and in the alkylene, at least one $—CH_2—$ may be replaced by —O—, —COO—, —OCO— or —OCOO—, at least one $—CH_2—CH_2—$ may be replaced by —CH═CH— or —C≡C —, and in the alkylene and the groups obtained through the replacement, at least one hydrogen may be replaced by fluorine or chlorine; g is 0, 1 or 2; h, j and k are independently 0, 1, 2, 3 or 4; and a sum of h, j and k is 1 or more.

15. A liquid crystal display device, including the liquid crystal composition of claim 1.

16. The liquid crystal display device of claim 15, wherein an operating mode of the liquid crystal display device is an IPS mode, a VA mode, an FFS mode or an FPA mode, and a driving mode of the liquid crystal display device is an active matrix mode.

17. A polymer sustained alignment mode liquid crystal display device, which includes the liquid crystal composition of claim 10, or a composition obtained by polymerizing the polymerizable compound in the liquid crystal composition.

* * * * *